United States Patent
Zhao et al.

(10) Patent No.: US 11,347,940 B2
(45) Date of Patent: May 31, 2022

(54) ASYNCHRONOUS ROLE-PLAYING SYSTEM FOR DIALOG DATA COLLECTION

(71) Applicant: SOCO, Inc., Pittsburgh, PA (US)

(72) Inventors: Tiancheng Zhao, Pittsburgh, PA (US); Kyusong Lee, Pittsburgh, PA (US); Yilian Liu, Pittsburgh, PA (US)

(73) Assignee: SOCO, Inc., Pittsburgh, PA (US)

( * ) Notice: Subject to any disclaimer, the term of this patent is extended or adjusted under 35 U.S.C. 154(b) by 0 days.

(21) Appl. No.: 17/044,130

(22) PCT Filed: Oct. 16, 2018

(86) PCT No.: PCT/US2018/056003
§ 371 (c)(1),
(2) Date: Sep. 30, 2020

(87) PCT Pub. No.: WO2020/081054
PCT Pub. Date: Apr. 23, 2020

(65) Prior Publication Data
US 2021/0240927 A1    Aug. 5, 2021

(51) Int. Cl.
| | |
|---|---|
| *G06F 40/211* | (2020.01) |
| *G06F 40/35* | (2020.01) |
| *G06F 40/279* | (2020.01) |
| *G06K 9/62* | (2022.01) |
| *G06N 5/02* | (2006.01) |
| *G06N 3/04* | (2006.01) |

(Continued)

(52) U.S. Cl.
CPC .......... *G06F 40/211* (2020.01); *G06F 40/279* (2020.01); *G06F 40/35* (2020.01); *G06K 9/6256* (2013.01); *G06N 5/025* (2013.01); *G06N 5/04* (2013.01); *G10L 15/22* (2013.01); *G06N 3/0454* (2013.01)

(58) Field of Classification Search
CPC ...... G06F 40/211; G06F 40/35; G06F 40/279; G10L 15/22; G06N 5/04; G06N 5/025; G06N 3/0454; G06K 9/6256
USPC .............................................................. 704/9
See application file for complete search history.

(56) References Cited

U.S. PATENT DOCUMENTS

| | | | |
|---|---|---|---|
| 10,083,006 B1 * | 9/2018 | Feuz .................... | H04W 4/12 |
| 10,521,557 B2 * | 12/2019 | Jain .................... | G16H 10/60 |

(Continued)

OTHER PUBLICATIONS

Lasecki, Walter S., et al., "Conversations in the Crowd: Collecting Data for Task-Oriented Dialog Learning", In: First AAAI Conference on Human Computation and Crowdsourcing, Nov. 3, 2013 (4 pages).

(Continued)

*Primary Examiner* — Edwin S Leland, III
(74) *Attorney, Agent, or Firm* — Finnegan, Henderson, Farabow, Garrett & Dunner, LLP

(57) ABSTRACT

Techniques for dialog data collection are disclosed. In an embodiment, a method comprises providing a first graphical user interface (10) configured to receive first user input data, providing a second graphical user interface (20) configured to receive second user input data, asynchronously transmitting the first user input data to the second graphical user interface (20) or the second user input data to the first graphical user interface (10), and generating training data for a natural language processing system model (60) based on the first user input data and the second user input data.

16 Claims, 17 Drawing Sheets

(51) Int. Cl.
*G10L 15/22* (2006.01)
*G06N 5/04* (2006.01)

(56) References Cited

U.S. PATENT DOCUMENTS

| | | | | |
|---|---|---|---|---|
| 10,855,485 | B1* | 12/2020 | Zhou | G06F 3/013 |
| 2009/0097757 | A1* | 4/2009 | Wimsatt | G06T 13/00 |
| | | | | 382/190 |
| 2009/0119586 | A1* | 5/2009 | Weng | G06F 8/30 |
| | | | | 715/705 |
| 2010/0286985 | A1* | 11/2010 | Kennewick | G10L 15/1822 |
| | | | | 704/257 |
| 2013/0325443 | A1* | 12/2013 | Begeja | G10L 15/22 |
| | | | | 704/9 |
| 2014/0081624 | A1* | 3/2014 | Morris | G06F 9/45558 |
| | | | | 704/9 |
| 2017/0103679 | A1* | 4/2017 | Campbell | G06F 40/274 |
| 2017/0193114 | A1* | 7/2017 | Smit | G06F 16/338 |
| 2020/0076746 | A1* | 3/2020 | Penrose | H04L 12/1822 |
| 2020/0097544 | A1* | 3/2020 | Alexander | G06N 3/0454 |
| 2021/0240927 | A1* | 8/2021 | Zhao | G06F 40/211 |

OTHER PUBLICATIONS

Okamoto, M., et al., "Wizard of Oz Method for Learning Dialog Agents", In: International Workshop on Cooperative Information Agents, Oct. 16, 2001 (10 pages).

International Search Report and Written Opinion dated Jan. 8, 2019, in International Application No. PCT/US2018/056003 (8 pages).

Serban, Iulian V., et al., "Building End-to-End Dialogue Systems Using Generative Hierarchical Neural Network Models", In: Proceedings of the Thirtieth AAAI Conference on Artificial Intelligence (AAAI-16) 2016 (8 pages).

Kannan, Anjuli, et al., "Smart Reply: Automated Response Suggestion for Email", KDD '16, Aug. 13-17, 2016, San Francisco, CA, USA (10 pages).

Budzianowski, P., et al., "MultiWOZ—A Large-Scale Multi-Domain Wizard-of-Oz Dataset for Task-Oriented Dialogue Modelling", In: Proceedings of the 2018 Conference on Empirical Methods in Natural Language Processing, pp. 5016-5026, Brussels, Belgium, Oct. 31-Nov. 4, 2018.

* cited by examiner

ASYNCHRONOUS ROLE-PLAYING SYSTEM FOR DIALOG DATA COLLECTION

CROSS REFERENCE TO RELATED APPLICATIONS

This is a national stage entry of International Application No. PCT/US2018/056003, filed Oct. 16, 2018, which is incorporated herein by reference in its entirety.

BACKGROUND

Technical Field

Embodiments discussed herein generally relate to natural language processing and, more particularly, to systems and methods for asynchronous role-playing that may be applicable in dialog data collection.

Description of Related Art

Human-machine interaction allows a user to communicate with a machine by inputting natural language, such as by typing, speaking, gesturing, or performing other types of expression. Chatbots, also known as conversational agents, conversational AI, dialog systems, and the like, are programs that respond to natural language input in a humanlike manner.

Generally, many enterprise systems have attempted to use chatbots to acquire customers or to help reduce costs by replacing humans with AI chatbots. Some difficulties, however, encountered in building a smart chatbot may include the following.

For example, dialog data available for training may be too sparse. One of the challenges in building a chatbot is collecting sufficient dialog data in a specific domain. Domains (also known as categories, classes, etc.) are general fields of information. Example domains include weather, stocks, sports, restaurants, and the like. A business may be engaged in a specific industry, and thus, may be interested in employing a chatbot targeted to one or more specific domains. However, it may be difficult to collect high quality dialog data for a specific business's target operations, which may require large amounts of data unique to each of one or more specific domains. There must be a sufficiently large amount of data provided to train the chatbot.

Furthermore, businesses may demand high accuracy. Chatbots may be required to respond to customers with high accuracy in the context of a particular business. If chatbots give the wrong information, it could have serious implications. Therefore, many chatbots that are to be employed by businesses are built by a rule-based or dialog flow-based approach in which users are only allowed to follow a pre-defined scenario. Otherwise, chatbots may be unable to generate proper responses. It is also very difficult to apply a chatbot in a business that requires complex dialog or expert domain knowledge, such as law, medicine, or sales.

One existing method to build a chatbot may use a Wizard of Oz (WoZ). See, e.g., Okamoto et al., Wizard of Oz Method for Leaning Dialog Agents, International Workshop of Cooperative Information Agents, Springer, Berlin, Heidelberg, 2001. WoZ involves a method in which a user and a "Wizard" (a person who behaves as if he/she were a system) talk together. The WoZ technique may be useful because human-human dialog should not be applied to human-computer dialog interfaces. For example, when speaking to conventional speech recognition systems, users often feel the need to modify their natural way of speaking so that a machine can understand the user's intention. Thus, there may be differences in utterances used when a user thinks the partner of the communication is a computer and utterances used when he/she thinks the partner is a person. The WoZ method is useful for eliciting such responses and is usually used for prototyping a system. While WoZ may be a promising method to collect dialog data, there are many limitations. For example, WoZ is very slow to collect human-human dialog, and much of the collected dialog is repetitive, which adds no new information, etc.

SUMMARY

Embodiments of the present disclosure may include technological improvements as solutions to one or more technical problems in conventional systems discussed herein as recognized by the inventors. In view of the foregoing, some embodiments discussed herein may provide systems and methods for asynchronous dialog collection for natural language.

In one embodiment, a method for generating training data for training one or more models implemented in a natural language processing system is disclosed. A method may include the steps of: providing a first graphical user interface configured to receive first user input data; providing a second graphical user interface configured to receive second user input data; asynchronously transmitting the first user input data to the second graphical user interface or the second user input data to the first graphical user interface; and generating training data for a natural language processing system model based on the first user input data and the second user input data.

In accordance with some embodiments, asynchronous role playing may be performed for dialog data collection. Collection speed may be enabled to grow linearly with the size of a dialog data collection team. Furthermore, dialog data collection may be guided such that new data points contain new information, and the gathering of repetitive information is minimized. Dialog data collection may be enhanced such that generating training data for a chatbot may be made faster, more efficient, and a process may be easily scaled up. Furthermore, end-to-end training techniques may be employed that may mimic domain experts, thus allowing collection of highly detailed dialogs containing expert domain knowledge.

It is to be understood that both the foregoing general description and the following detailed description are exemplary and explanatory only and are not restrictive of the subject matter claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
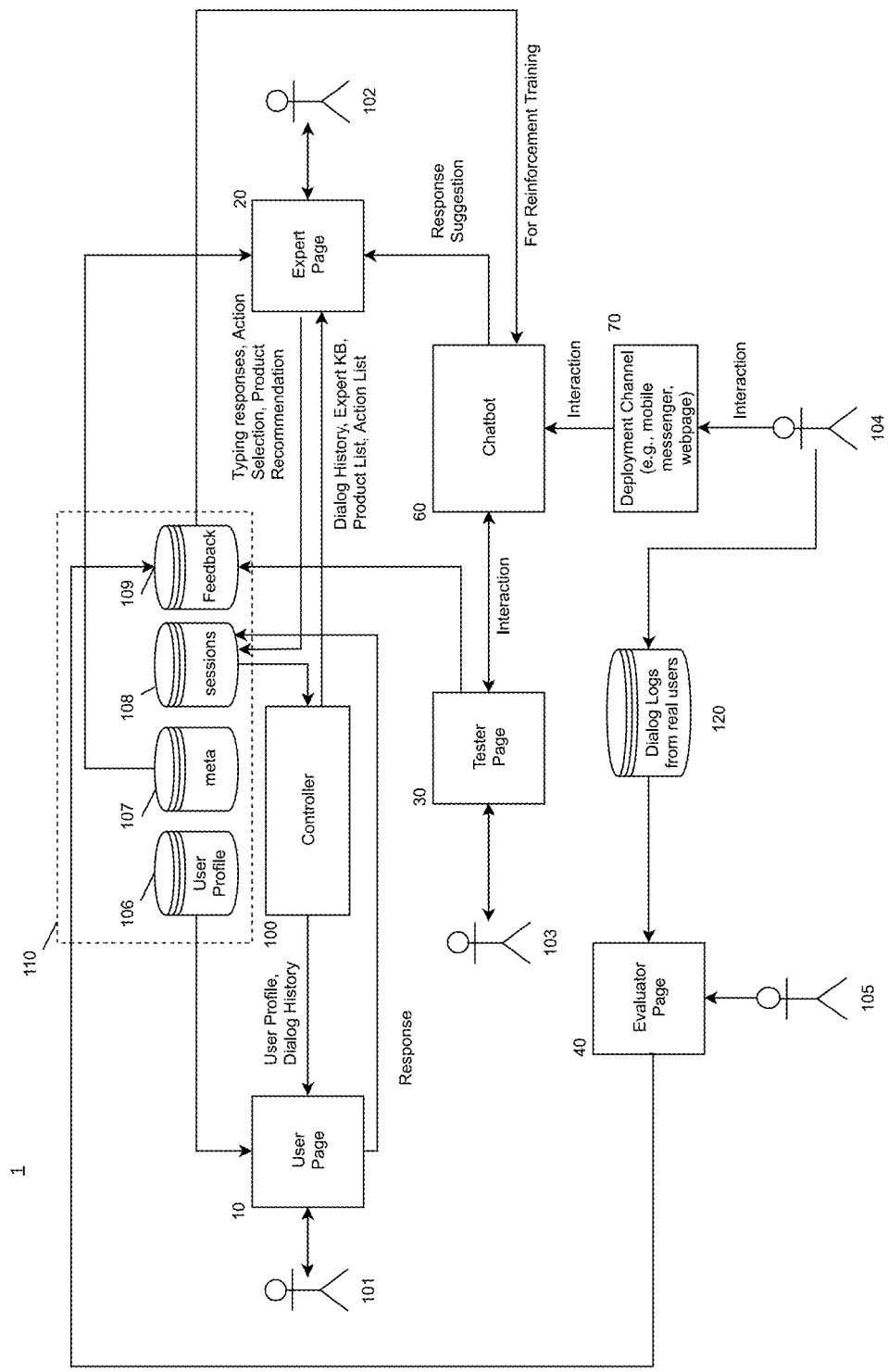
FIG. 1 illustrates a system for dialog data collection, consistent with embodiments of the present disclosure.

Reference will now be made in detail to exemplary embodiments, examples of which are illustrated in the accompanying drawings. Wherever convenient, the same reference numbers are used throughout the drawings to refer to the same or like parts. The implementations set forth in the following description of exemplary embodiments do not represent all implementations consistent with the present disclosure. While some examples and features of disclosed principles are described herein, modifications, adaptations, and other implementations are possible without departing from the spirit and scope of the disclosed embodiments. It is intended that the following detailed description be considered as merely examples of systems, apparatuses, and methods consistent with aspects related to the invention as may be recited in the appended claims.

As used herein, unless specifically stated otherwise, the term "or" encompasses all possible combinations of elements, except where infeasible. For example, if it is stated that a component includes A or B, then, unless specifically stated otherwise or infeasible, the component may include A, or B, or A and B. As a second example, if it is stated that a component includes A, B, or C, then, unless specifically stated otherwise or infeasible, the component may include A, or B, or C, or A and B, or A and C, or B and C, or A and B and C. Furthermore, the phrase "one of A and B" shall be interpreted in the broadest sense to include one of A, or one of B.

In some embodiments of the present disclosure, there is provided a system for dialog data collection. The system may include the use of a Smart Wizard of Oz (SmartWoZ). A SmartWoZ controller may be provided that generates one or more user interfaces and that coordinates data transmission between them and among other components of a system.

In a comparative example, a traditional Wizard of Oz (WoZ) approach may allow a user to communicate with a wizard who plays the role of a system. In such an approach, a user and a wizard may be paired together to conduct a simulated dialog between a user and a machine. Both the user and the wizard must be engaged and active in the conversation. The user may input an utterance, which is transmitted to the wizard, who then inputs an utterance in response. One issue in this approach may be that a bottleneck forms when waiting for responses from one or both of the user and wizard.

A SmartWoZ approach may involve providing a user interface to a first operator, and providing another user interface to a second operator. The user interfaces may allow the operators to access past dialog histories and participate in dialogs at their convenience. Furthermore, each operator may have access to a plurality of dialogs and may quickly cycle through the dialogs by providing a response and then moving on to the next session. Operators may process large numbers of dialogs in a batch.

A SmartWoZ controller may intermediate data transmission between operators, among other components. Furthermore, the controller may perform sampling on stored dialogs to provide dialogs in weak areas of dialog data coverage. Sampled dialogs may then be provided to operators to complete such that new dialogs may be generated that fill the gaps in training data to be used for building a natural language processing system model. Additionally, a system may incorporate the model for use in real time during training. The model may be used to provide response suggestions for the system role, which may further enhance dialog data collection efficiency.

TABLE 1

| Type | Traditional WoZ | SmartWoZ |
| --- | --- | --- |
| Speed | Very Slow | Fast |
| Response Waiting Time | Yes | No |
| Matching Waiting Time | Yes | No |
| Setting | Hard to make settings for matching between wizards and users | No matching needed |
| Type | One-to-one | One-to-many |
| Collection Method | Hard to collect only weak parts of data. No control over sampling region. | Targeted sampling for weak parts of data for training. Controlled sampling. |
| Suggestions for Wizard | No | Yes |

In the above TABLE 1, response waiting time may refer to the time that an operator waits until another operator, who is the partner in the conversation, responds. Matching waiting time may refer to the time that an operator waits until another operator joins the same session. One-to-one type may refer to a situation in which one operator talks to only one other operator. One-to-many type may refer to a situation in which one operator can respond to many other operators.

FIG. 1 illustrates a system 1 for dialog data collection, consistent with embodiments of the present disclosure. As shown in FIG. 1, the system 1 may include a controller 100. Controller 100 may include a processor and a memory. System 1 may also include a database 110. Database 110 may include a storage unit such as a non-transitory computer readable medium. Database 110 may include user profile storage 106, metadata storage 107, session storage 108, and feedback storage 109. Database 110 may be a single storage unit or a number of units, all of which may include multiple storage units. Database 110 may include components that are distributed.

System 1 may further include a chatbot 60. Chatbot 60 may be a conversational agent that may be implemented as a computer program. Chatbot 60 may be configured to process natural language input expressed by a user and perform commands, generate responses, and the like, according to a derived intention of the user. Chatbot 60 may include a natural language processing system model that trains on user-generated data. Chatbot 60 may include a computer-implemented application that resides on a computing platform, including a processor and a memory. In some embodiments, chatbot 60 may be provided by a server and may be configured to communicate with user terminals provided at remote locations. System 1 may be configured to run while chatbot 60 trains on data generated by system 1. There may be provided a training database storing training data for training chatbot 60.

As one example of chatbot 60, there may be provided an end-to-end neural bot. The bot may utilize deep learning neural networks. End-to-end approaches, also known as encoder/decoder architectures, may be useful in goal-driven systems such as artificial intelligence (AI) customer service, sales representative, or technical support services. An encoder may be used to make a meaningful vector representation from dialog history and current user input. A decoder may generate system output from the vector representation. Such a bot may employ training data generated from data collected by worker crowdsourcing. Chatbot 60 may be configured by a model for implementing a natural language processing system. A model representing the natural language processing system of chatbot 60 may be herein referred to as a "model."

System 1 may be configured to interact with a plurality of operators. For example, system 1 may include user role player 101, expert role player 102, tester 103, real user 104, and evaluator 105. Chatbot 60 may be built based on data from a data collection team that may use a SmartWoZ. For example, in some embodiments, human intervention may be used to build a chatbot, and thus, a data collection team may comprise human role players. The data collection team may be divided into user role players and expert role players, among others. Chatbot 60 may be configured to automatically train during a dialog data collection process proceeding between user role players and expert role players. During the dialog data collection process, chatbot 60 may be used to process natural language input and generate an output. For example, chatbot 60 may be used to suggest response candidates to expert role players based on input gathered from user role players.

Chatbot 60 may be configured to interact with operators via an interface 70. Interface 70 may include an external deployment channel, such as a mobile messenger, webpage, etc. Interface 70 may utilize an application programming interface (API) for receiving requests and returning responses.

Further databases may be provided. For example, system 1 may include dialog log 120. Dialog log 120 may store data of chat information from one or more of a user 104 interacting with chatbot 60. Data stored in dialog log 120 may include a history of user inputs such as queries and commands to chatbot 60. Data may include a complete history of a user's inputs, or subsets thereof. Data may be stored in a machine learning manner, for example, being organized according to a predefined set of rules. Although illustrated as being outside of database 110 in FIG. 1, it is appreciated that dialog log 120 may be provided in the same structure as that of database 110.

One or more graphical user interfaces (GUIs) may be provided for use in a dialog data collection process. A controller may be configured to provide GUIs to operators and to coordinate data received therefrom. GUIs may include interactive pages that may be presented to users for collecting input. As shown in FIG. 1, system 1 may include a user page 10, an expert page 20, a tester page 30, and an evaluator page 40. To build a smart chatbot, it may be important to gather feedback from a data collection team in a manner such that data sparseness is minimized while avoiding data overfitting. As shall be described in further detail herein, pages may be provided that include a plurality of sessions in which pertinent portions of dialog are addressed, and sessions may be cycled such that operators may process different dialogs quickly. Operators may provide inputs into various dialogs asynchronously such that corresponding operators need not wait for their dialog partner's response. Sessions may be provided to GUIs with dialogs at various intermediate stages of a conversation. A sampling strategy may be used to select portions of dialog where data collection is most needed. A controller configured to provide GUIs and to coordinate data may be useful in building a smart chatbot.

Although FIG. 1 shows some example components of system 1, in other implementations, system 1 may contain fewer components, additional components, different components, or differently arranged components from those depicted in FIG. 1.

Figure 2:
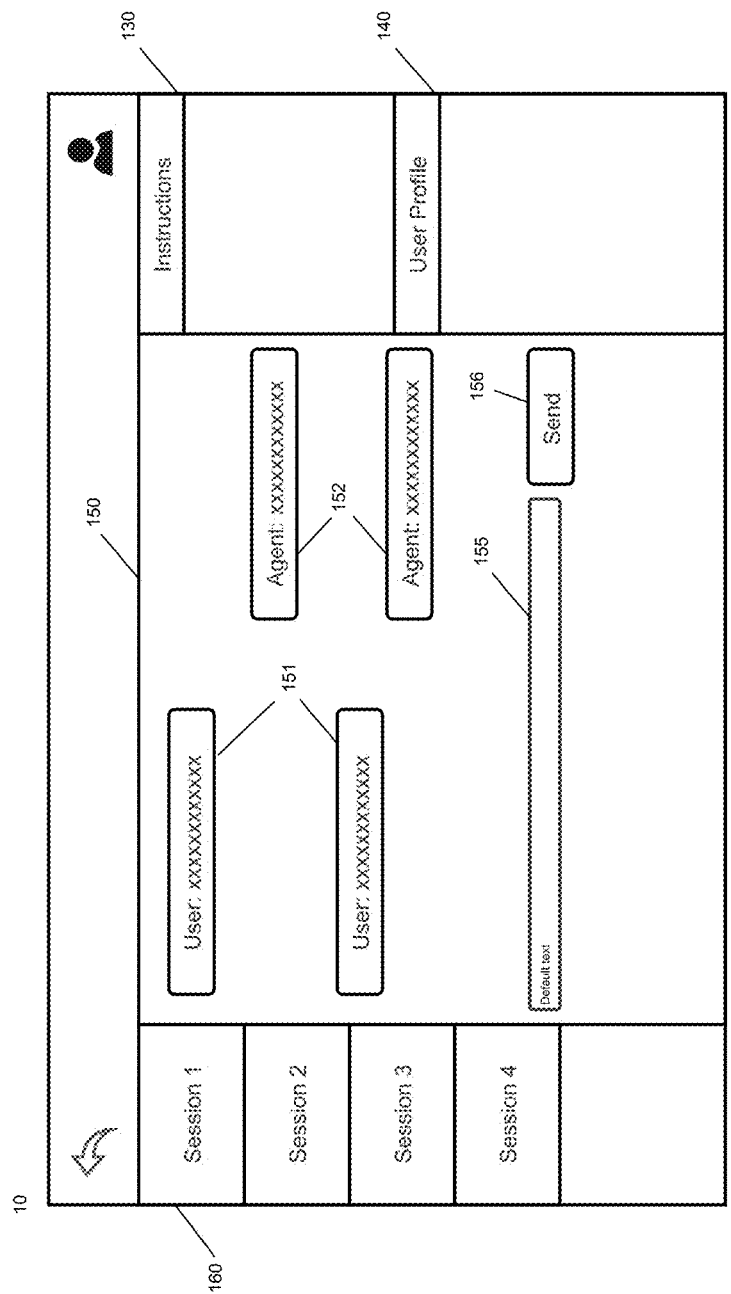
FIG. 2 illustrates a user page, consistent with embodiments of the present disclosure.

Reference is now made to FIG. 2, which shows an example of user page 10, consistent with embodiments of the present disclosure. User page 10 may include an instruction list 130, a user profile 140, a dialog window 150, a session list 160, and a navigation pane 180. Instruction list 130 may be displayed which includes instructions for a user role player to interact with user page 10. The user may be instructed to engage in a dialog, which may be a goal-based dialog, with a partner, who may be assumed to be a machine. Instruction list 130 may include a task, such as asking for directions, gathering information, completing an order, and so on. For example, instruction list 130 may indicate that the operator is expected to play the role of a person described by user profile 140 and interact with an expert. In one exemplary embodiment, system 1 may be configured to provide a dialog data collection system for a cosmetics retailer. Thus, user role player 101 may play the role of a potential customer and expert role player 102 may play the role of a product specialist ("agent"). Instruction list 130 may instruct the operator to inquire of the expert about buying products for the operator's proposed need. User profile 140 may display, for example, age, gender, race, skin type, skin care product use history, preferences, etc. User profile 140 may be retrieved from user profile database 106.

Dialog window 150 may include a dialog history with user utterances 151 and agent utterances 152. The dialog history may be pre-populated. Dialog window 150 may be scrollable such that past utterances can be viewed. Other forms of display of dialog history may be provided, such as a dialog flow graph. User page 10 may be configured to receive input from the operator, such as by typing or speaking. For example, the operator of user page 10 may input a new utterance via text box 155. The operator may click send button 156 to transmit the utterance to system 1.

User page 10 includes session list 160 that may indicate the active session (e.g., Session A) and a plurality of other sessions. Upon clicking send button 156, the current session may terminate and the operator may be provided with a new session with a new dialog history and new user profile. The terminated session may be stored in sessions database 108, and may then be transmitted to expert page 20 at a later time. Sessions may be changed at the will of the user, also, for example by selecting another session among those listed in session list 160.

Figure 3:
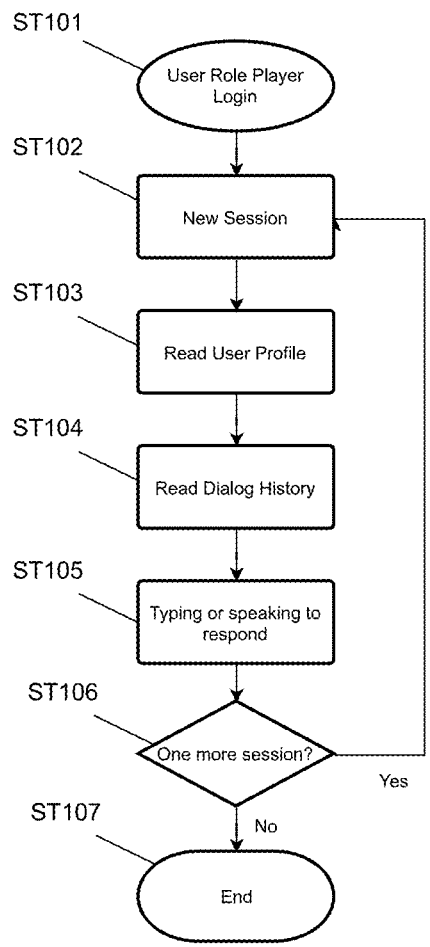
FIG. 3 is a flow chart illustrating a flow of a dialog data collection process for a user role player, consistent with embodiments of the present disclosure.

FIG. 3 illustrates an exemplary flow diagram of a dialog data collection process from the perspective of a user role player, consistent with embodiments of the present disclosure. In step ST101, user role player 101 may login to system 1. Login may require authentication of user credentials. In step ST102, system 1 may provide user role player 101 with a new session. Step ST102 may include providing user role player 101 with a GUI, such as user page 10. Controller 100 may generate user page 10 and transmit it to a terminal, such that user page 10 may be provided to user role player 101. In step ST103, user role player 101 may read instruction list 130 and user profile 140. In step ST104, user role player 101 may read the dialog history in dialog window 150. In step ST105, user role player 101, pretending to be the person described by user profile 140, may participate in dialog by inputting an utterance via text box 155 and submitting it. Submitted utterances may be stored in session database 108 (see FIG. 1). Such submitted utterances may be provided to expert role player 102 at a later time. For example, input gathered from user role player 101 may be sampled and selectively delivered to expert page 20. Controller 100 may be configured to sample session database 108 and provide data to expert page 20 as one or more separate sessions. Data may be transmitted from user page 10 to expert page 20 asynchronously.

Upon submitting an utterance in step ST105, the process may proceed to step ST106. In step ST106, it may be determined whether to provide a new session to user role player 101. For example, controller 100 may be configured to provide a plurality of sessions in user page 10, such as the plurality of sessions in session list 160. When user role player 101 submits a response by, for example, clicking send button 156, controller 100 may determine that the user role player's participation in a dialog is complete and may terminate the active session. If other sessions are remaining in session list 160, controller 100 may provide the next session. If no sessions are remaining, the process may proceed to step ST107 where the process ends.

An operator's input may be required to advance the dialog in a particular session. For example, the agent may request information from user role player 101 in order to serve the user role player's request for a product recommendation. Thus, a dialog session may be paused while waiting for the user role player's response. In some embodiments, user role player 101 may dispose of an active session in other ways. For example, user role player 101 may indicate a session as repetitive, unintelligible, or not requiring a response by user role player 101. Controller 100 may transmit such feedback to database 110.

Figure 4:
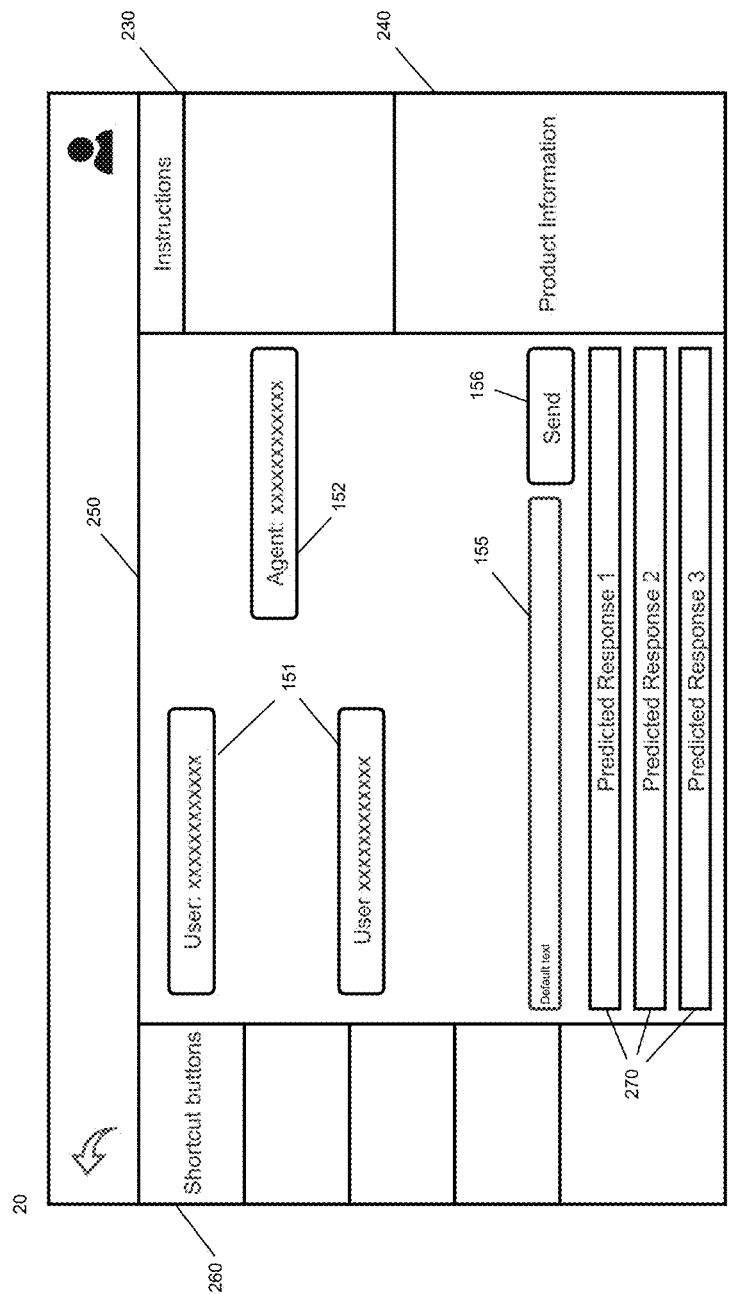
FIG. 4 illustrates an expert page, consistent with embodiments of the present disclosure.

Reference is now made to FIG. 4, which shows an example of expert page 20, consistent with embodiments of the present disclosure. Expert page 20 may include an instruction list 230, product information 240, a dialog window 250, and shortcut buttons 260. Instruction list 230 may be displayed which includes instructions for an expert role player to interact with expert page 10. For example, instruction list 230 may indicate that the operator is expected to play the role of an expert and interact with another user. When system 1 is configured to provide a dialog data collection system for a cosmetics retailer, for example, expert role player 102 may play the role of the agent or product specialist while user role player 101 plays the role of potential customer. Expert page 20 includes various control panels that may enable expert role player 102 to respond quickly and thus speed up data collection. For example, shortcut buttons 260 may include previous or recommended system actions, expert knowledgebase (KB), commonly used conversation-starters, or other phrases that may be useful in dialog data collection. Product information 240 may be retrieved from meta database 107.

Furthermore, predicted responses 270 may be provided, which may be based on data from chatbot 60. For example, chatbot 60 may be automatically trained on collected dialog, and thus may be used to provide suggestions to expert role player 102. Dialog history that is to be provided to expert page 20 may be input to chatbot 60, which may then generate predicted responses based thereon and transmit them to expert page 20. If a proper answer is among the suggestions provided in expert page 20, expert role player 102 may select one of them to use in the current dialog. Otherwise, expert role player 102 may take other actions, such as selecting a pre-prepared entry among shortcut buttons 260, or type a new utterance in text box 155. Based on such selections, current performance of chatbot 60 may be evaluated, and feedback may be provided to controller 100 to adjust sampling strategy based on the current performance.

Dialog window 250 may include a dialog history with user utterances 151 and agent utterances 152. The dialog history may be retrieved from sessions database 108. Dialog window 250 may be scrollable such that past utterances can be viewed. Expert page 20 may be configured to receive input from the operator, such as by typing or speaking. After submitting an utterance, data may be transmitted to system 1 and the current session may terminate while the operator is provided with a new session having a new dialog history. The terminated session may be stored in sessions database 108, and may then be transmitted to user page 10 at a later time.

Figure 5:
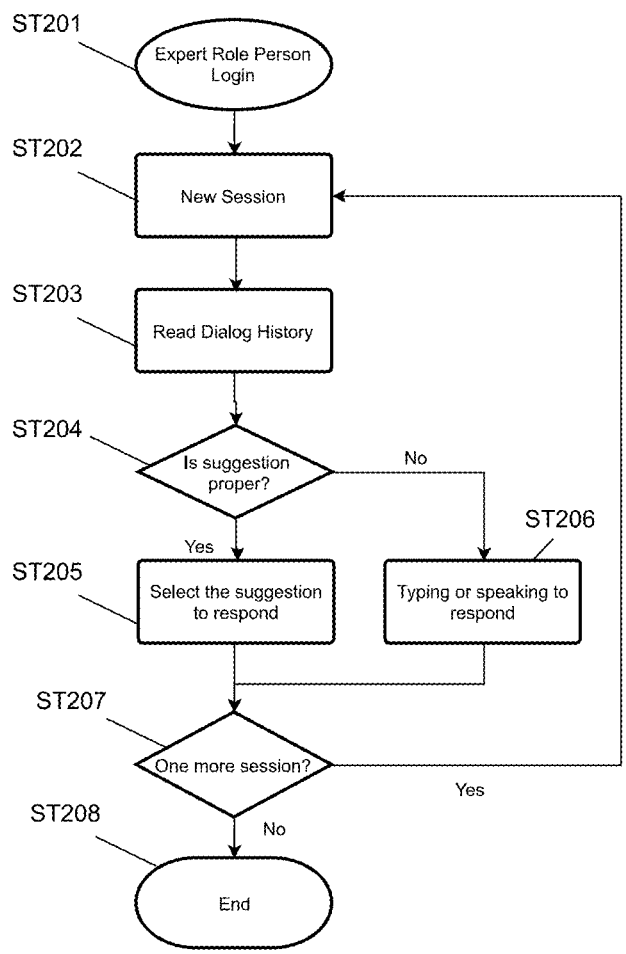
FIG. 5 is a flow chart illustrating a flow of a dialog data collection process for an expert role player, consistent with embodiments of the present disclosure.

FIG. 5 illustrates an exemplary flow diagram of a dialog data collection process from the perspective of an expert role player, consistent with embodiments of the present disclosure. In step ST201, expert role player 102 may login to system 1. In step ST202, system 1 may provide expert role player 102 with a new session. Step ST202 may include providing expert role player 102 with a GUI such as expert page 20. Controller 100 may generate expert page 20 and transmit it to a terminal, such that expert page 20 is provided to expert role player 102. In step ST203, expert role player 102 reads the dialog history in dialog window 250. In step ST204, it may be determined whether a suggested response, such as suggested responses 270, is appropriate for the current dialog. In response thereto, expert role player 102 may select a suggested response, as in step ST205, or expert role player 102 may input an utterance on his own, as in step ST206. Thereafter, an utterance, either a suggested response or a new input, may be submitted to system 1, and data may be transmitted to sessions database 108. Furthermore, based on the expert role player's response, additional data, such as feedback information, may be provided to system 1.

In step ST207, it may be determined whether to provide a new session to expert role player 102. For example, controller 100 may be configured to provide a plurality of sessions in expert page 20, such as in a session list that may be displayed on expert page 20. When expert role player 102 submits a response by, for example, clicking send button 156, controller 100 may determine that the expert role player's participation in a dialog is complete and may terminate the active session. If other sessions are remaining, controller 100 may provide the next session. If no sessions are remaining, the process may proceed to step ST208 where the process ends.

An operator's input may be required to advance the dialog in a particular session. For example, user role player 101 may request a product recommendation from the agent based on the user role player's profile information. Thus, a dialog session may be paused while waiting for the agent's response. The agent's response may cause the dialog session to terminate. In some embodiments, expert role player 102 may dispose of an active session in other ways. For example, expert role plate 102 may flag a session as indicating that it is not needed for use in training data. Expert role player 102 may indicate a session as repetitive, unintelligible, or not requiring a response by expert role player 102. Controller 100 may transmit such feedback to database 110.

Figure 6:
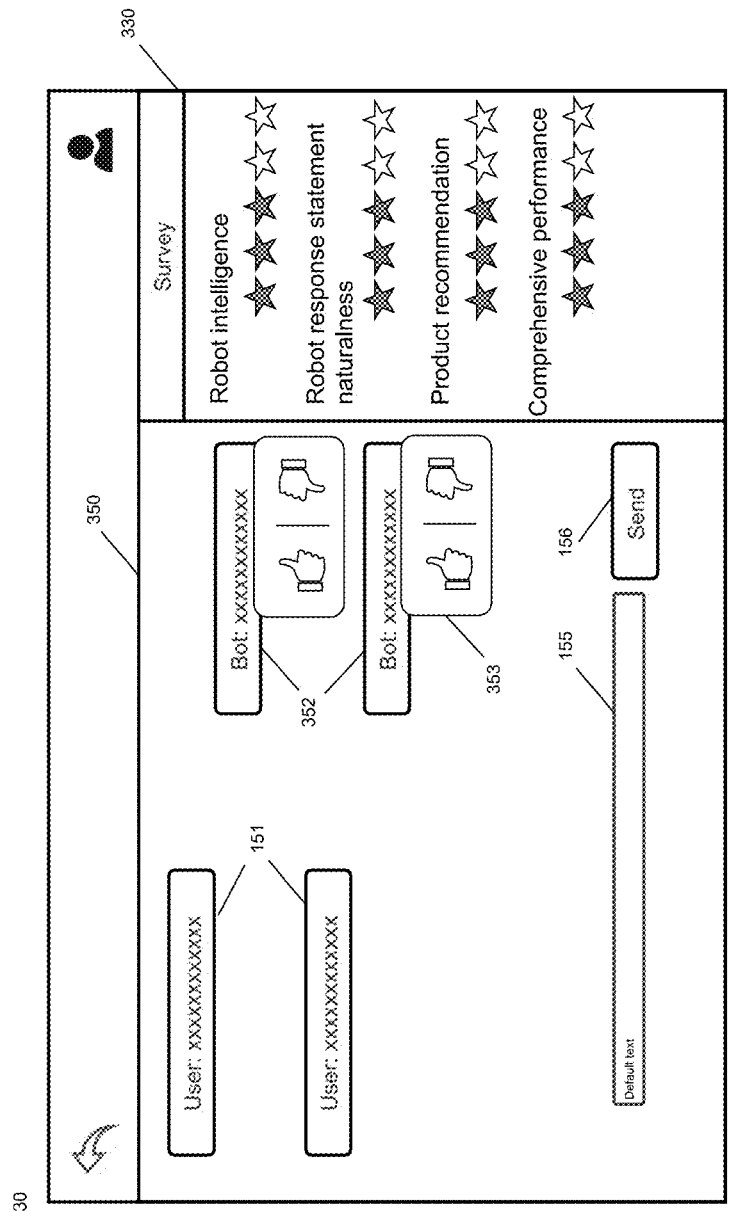
FIG. 6 illustrates a tester page, consistent with embodiments of the present disclosure.

Reference is now made to FIG. 6, which shows an example of tester page 30, consistent with embodiments of the present disclosure. Tester page 30 may include a survey section 330 and a dialog window 350. Survey section 330 may include one or more metrics for an operator to give feedback. Tester 103 may rate chatbot 60 on a scale of one to five stars, for example, in various categories. Furthermore, in dialog window 350, bot utterances 352 may include feedback portion 353. The operator may give feedback on individual utterances via feedback portion 353.

Tester page 30 may be provided with text input box 155 for tester 103 to interact with chatbot 60. In system 1, tester 103 may evaluate the current model by performing a stress test on chatbot 60. Tester 103 may attempt to break down chatbot 60 in order for chatbot 60 to learn to handle and respond well to out-of-domain utterances. Out-of-domain utterances may be unforeseen, and thus, may not be contained in database 110. Tester page 30 may be provided in system 1 when the amount of dialog data procured reaches a threshold level. For example, the threshold may be determined in advance to be a level in which the dialog data is enough to train chatbot 60 and performance is greater than or equal to a certain number (e.g., 50%). That is, the model may begin to be provided to tester 102 when the model becomes accurate above, for example, an acceptable error rate. Performance may be determined based on feedback provided by expert role player 102 via expert page 20. For example, performance may be determined based on the rate at which expert role player 102 selects suggestions 270 provided by chatbot 60.

Tester page 30 may be configured such that tester 103 can give two kinds of feedback: utterance level feedback; and dialog level feedback. Utterance level feedback may be provided each time an utterance is generated by chatbot 60, that is, for each turn. For example, tester 103 may select thumbs-up as positive feedback, or thumbs-down as negative feedback via feedback portion 353 in dialog window 350. Data associated with thumbs-up feedback may be used as reinforcing feedback for chatbot 60. For example, utterances associated with thumbs-up feedback may be used for action selection with a higher level of confidence, or may be added to an action bank. Data associated with thumbs-down feedback may be flagged for attention. For example, utterances associated with thumbs-down feedback may be provided to experts such that experts can revise the model for chatbot 60. Negative feedback samples may be used as a negative reward while training. Dialog level feedback may be used to evaluate the overall performance of chatbot 60. Ratings may be provided on a Likert scale (one to five), in categories such as naturalness, smartness, and overall score, for example.

Figure 7:
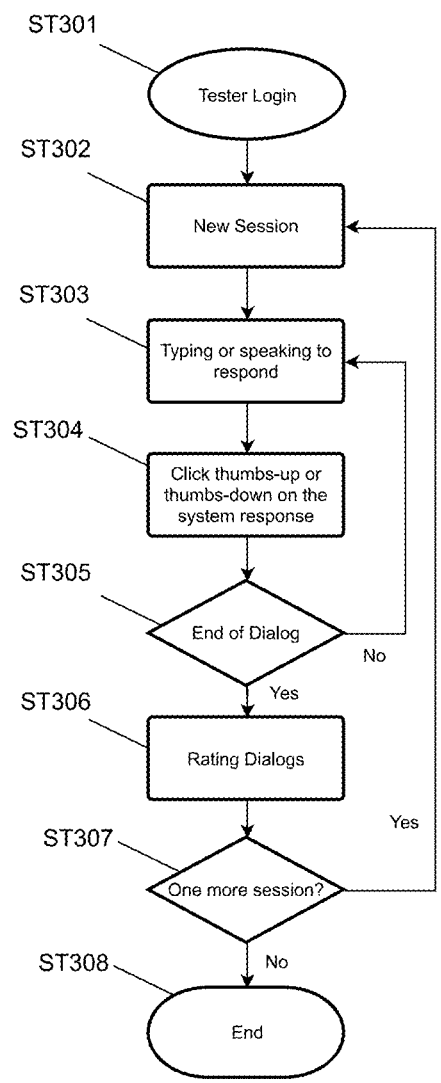
FIG. 7 is a flow chart illustrating a flow of a dialog data collection process for a tester, consistent with embodiments of the present disclosure.

FIG. 7 illustrates an exemplary flow diagram of a dialog data collection process from the perspective of a tester, consistent with embodiments of the present disclosure. In step ST301, tester 103 may login to system 1. In step ST302, system 1 may provide tester 103 with a new session. Step ST302 may include providing tester 103 with a GUI such as tester page 30. A controller may generate tester page 30 and transmit it to a terminal, such that tester page 30 is provided to tester 103. Tester 103 may interact directly with chatbot 60. In step ST303, tester 103 may initiate a dialog with chatbot 60, such as by typing into text box 155. In response to utterances input by tester 103, chatbot 60 may generate responses. In step ST304, tester 103 may provide utterance level feedback by, for example, clicking a thumbs-up or thumbs-down icon next to the system response.

In step ST305, it may be determined whether current dialog is finished. A dialog session may be concluded after a predetermined time, a predetermined number of utterances, or a predetermined number of topics are discussed, for example. Dialog may be concluded when a stress test limit is reached. In some embodiments, tester 103 may end a dialog session on his own initiative. In step ST306, tester 103 may be prompted to provide dialog level feedback.

In step ST307, it may be determined whether to provide a new session to tester 103. If other sessions are remaining in a session list for tester 103 to complete, the next session may be provided. If no sessions are remaining, the process may proceed to step ST308 where the process ends.

Figure 8:
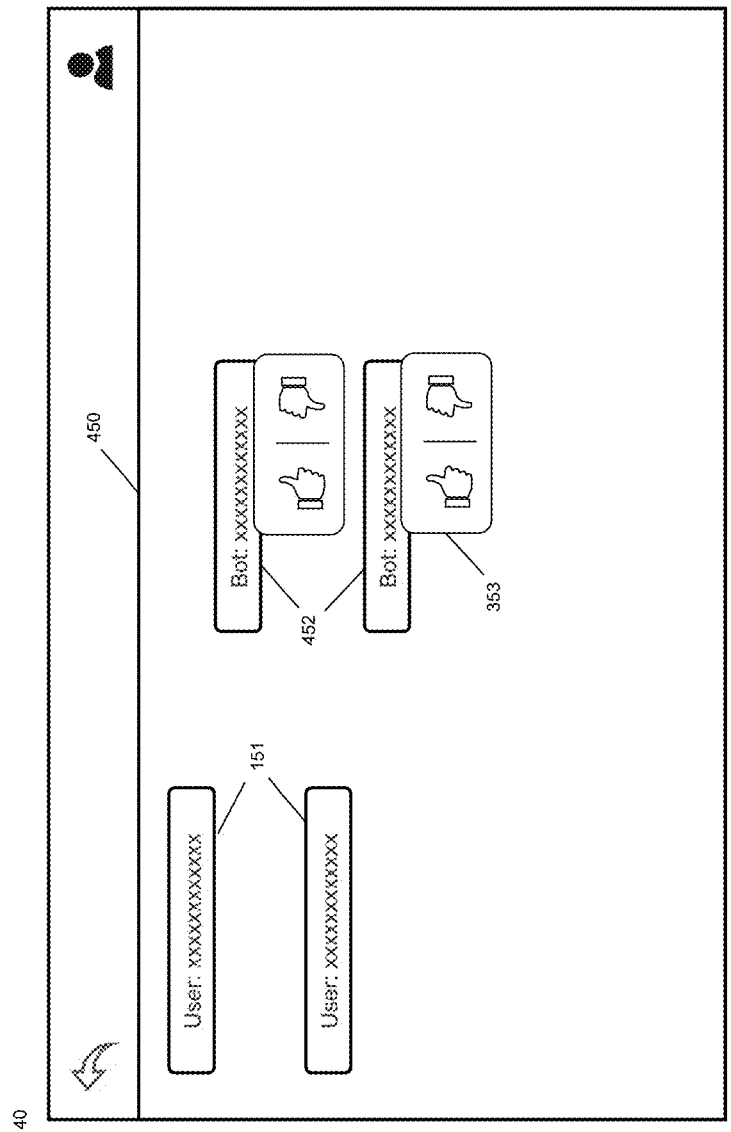
FIG. 8 illustrates an evaluator page, consistent with embodiments of the present disclosure.

Reference is now made to FIG. 8, which shows an example of evaluator page 40, consistent with embodiments of the present disclosure. Evaluator page 40 may include a dialog window 450. Dialog window 450 may include a dialog log from real user 104. User utterances 151 may be from user 104, while system utterances 452 may be provided from chatbot 60. Dialog provided in dialog window 450 may be retrieved from dialog log 120. Dialog window 450 may be scrollable such that an operator, such as evaluator 105, may view past portions of the dialog log.

In system 1, evaluator 105 may evaluate the current model by analyzing responses by chatbot 60 turn by turn. Evaluator 105 may review each turn in the dialog by clicking a thumbs-up or thumbs-down icon in feedback portion 353. Thumbs-up may indicate the response is acceptable, while thumbs-down may indicate the response is not acceptable. In some embodiments, it may not be necessary to provide feedback for every one of system utterance 452. Evaluator 105 may click thumbs-up for particularly good responses and thumbs down for bad replies. Such feedback may be saved in feedback database 109 and may be used to improve chatbot 60 by applying, for example, reinforcement learning training.

Figure 9:
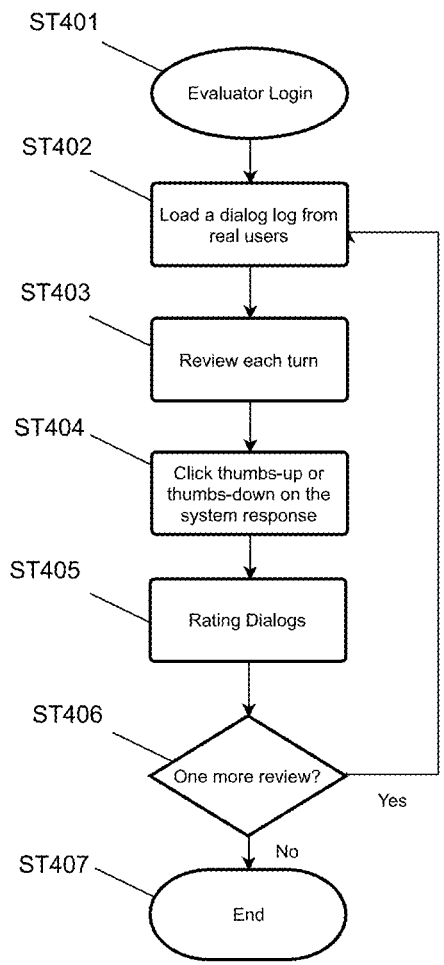
FIG. 9 is a flow chart illustrating a flow of a dialog data collection process for an evaluator, consistent with embodiments of the present disclosure.

FIG. 9 illustrates an exemplary flow of a dialog data collection process from the perspective of an evaluator, consistent with embodiments of the present disclosure. In step ST401, evaluator 105 may login to system 1. In step ST402, system 1 may provide evaluator 105 with a new session. Step ST402 may include providing evaluator 104 with a GUI such as evaluator page 40. A controller may generate evaluator page 40 and transmit it to a terminal, such that evaluator page 40 is provided to evaluator 105. In step ST403, evaluator 105 may review dialog between user 104 and chatbot 60. In step ST404, evaluator 105 may provide utterance level feedback by, for example, clicking a thumbs-up or thumbs-down icon next to the system response.

In step ST405, evaluator 105 may be prompted to provide dialog level feedback at the conclusion of reviewing a dialog in a manner similar to that of step S306 discussed above with respect to FIG. 7.

In step ST406, it may be determined whether to provide a new session to evaluator 105. If other sessions are remaining in a session list for evaluator 105 to complete, the next session may be provided. If no sessions are remaining, the process may proceed to step ST407 where the process ends.

Figure 10:
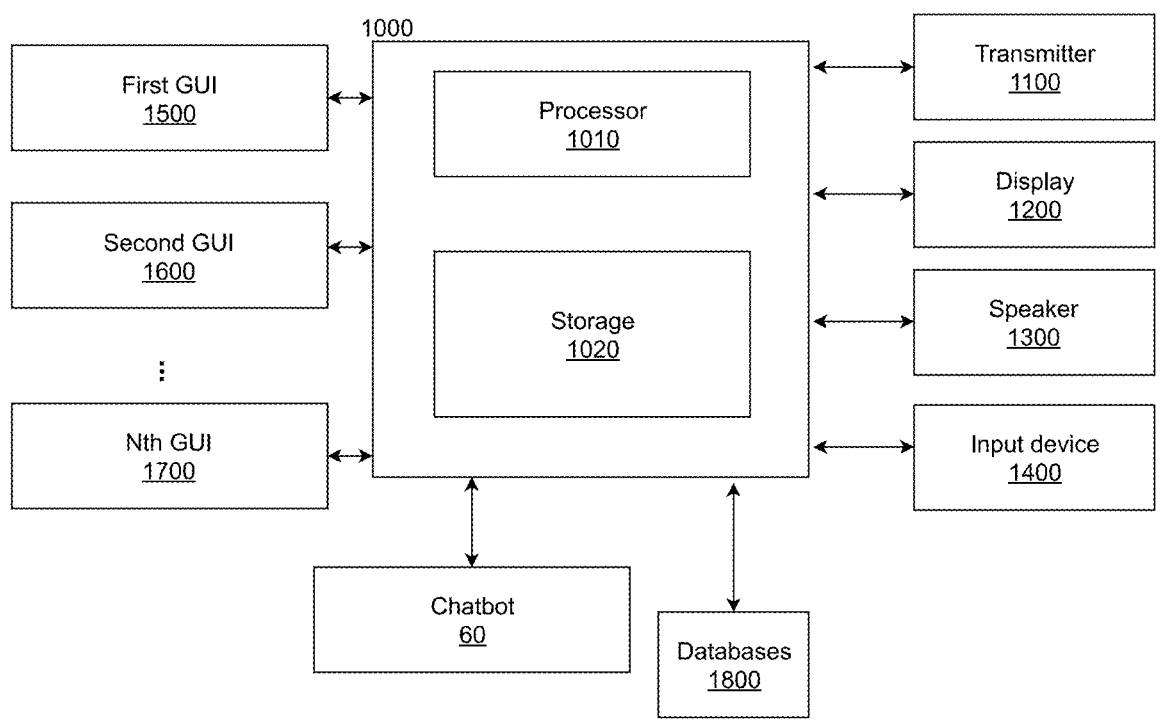
FIG. 10 illustrates a controller, consistent with embodiments of the present disclosure.

System 1 may include a controller programmed to provide GUIs. FIG. 10 illustrates an example of a controller 1000. Controller 1000 may be similar to controller 100 as shown in FIG. 1. GUIs may be provided to operators so that operators can provide user input data that may be used to build a natural language processing system model. For example, controller 1000 may be configured to provide a first GUI 1500 and a second GUI 1600, and to transmit data between them and other components. First GUI 1500 may be a user role player page, such as user page 10. Second GUI 1600 may be an expert role player page, such as expert page 20. Additional GUIs, such as tester page 30 and evaluator page 40, may be provided by the controller. Furthermore, multiple user role player pages, expert role player pages, tester pages, or evaluator pages may be provided to multiple operators.

Controller 1000 may include a processor 1010 and a storage 1020 communicatively coupled to one another. Processor 1010 and storage 1020 may be communicatively coupled by a system bus. Processor 1010 may include circuitry implementing, among other things, display, audio output, input, and logic functions associated with communication. Processor 1010 may include, among other things, a clock, an arithmetic logic unit (ALU), and logic gates configured to support operations of the processor. Processor 1010 may be a single processing unit or a number of units, all of which may include multiple computing units. Processor 1010 may be implemented as one or more hardware processors, microprocessors, microcomputers, microcontrollers, digital signal processors, central processing units, state machines, logic circuitries, or any devices that manipulate signals based on operational instructions. Among other capabilities, processor 1010 may be configured to fetch and execute computer-readable instructions and data stored in storage 1020.

Controller 1000 may interact with chatbot 60. Controller 1000 may send and receive data to chatbot 60, such as dialog data. Dialog data may be processed by chatbot 60 to, for example, provide response suggestions. Data such as dialog histories may be provided to chatbot 60 as training data. Controller 1000 be communicatively coupled to other components, such as transmitter 1100, display 1200, speaker 1300, and input device 1400, among others.

The functions of various elements shown in the figures, including any functional blocks, such as a "chatbot," may be provided through the use of dedicated hardware as well as hardware capable of executing software in association with appropriate software. When provided by a processor, the functions may be provided by a single dedicated processor, by a single shared processor, or by a plurality of individual processors, some or all of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional, or custom, may also be included.

The interfaces may include a variety of software and hardware interfaces, for example, interfaces for peripheral devices, such as a keyboard, a mouse, an external memory, and a printer. Such interfaces may facilitate multiple communications within a wide variety of networks and protocol types, including wired networks, for example, local area network (LAN), cable, etc., and wireless networks, such as Wireless LAN (WLAN), cellular, or satellite. For such purposes, interfaces may include one or more ports for connecting components in system 1 to other devices. First GUI 1500, second GUI 1600, and Nth GUI 1700, for example, may include such interfaces. While first GUI 1500 and second GUI 1600, for example, are described as "graphical" user interfaces, it is understood that a user interface may be provided without necessarily using graphical display of data. For example, a user interface may be provided through audible sound via a speaker, such as an AI speaker. Functionalities of user page 10 and expert page 20, for example, may be provided through spoken words.

Storage 1020 of controller 1000 may include any computer-readable medium known in the art including, for example, volatile memory, such as static random access memory (SRAM) and dynamic random access memory (DRAM), or non-volatile memory, such as read only memory (ROM), erasable programmable ROM, flash memories, hard disks, optical disks, and magnetic tapes. Storage 1020, may store any number of pieces of information, and data, used by controller 1000 or system 1 to implement the functions thereof. Storage 1020 may be configured to store information, data, applications, instructions or the like for enabling controller 1000 to carry out various functions in accordance with various example embodiments. Additionally, or alternatively, storage 1020 may be configured to store instructions which when executed by processor 1010 causes controller 1000 to behave in a manner as described in various embodiments. Storage 1020 may database 110 other modules. In some embodiments, databases may be provided remotely, such as via databases 1800, which may include database 110. Storage 1020 may include routines, programs, objects, components, data structures, etc., which perform particular tasks or implement particular abstract data types. Other modules may be included, such as programs or coded instructions that supplement applications and functions of system 1.

Controller 1000 may be programmed to implement various processing. Controller 1000 may be programmed to provide a first graphical user interface and a second graphical user interface, and so on. For example, as illustrated in FIG. 10, controller 1000 is communicatively coupled to a plurality of GUIs including first GUI 1500, and second GUI 1600 through Nth GUI 1700. The first GUI may be configured to receive first user input data, and the second GUI may be configured to receive second user input data. The first GUI may be a user role player page, such as user page 10, and the second GUI may be an expert role player page, such as expert page 20. The first user input data may include information input by the operator of the first GUI, who may be user role player 101, such as dialog utterances input into text box 155 of user page 10. The second input data may include information input by the operator of the second GUI, who may be expert role player 102, such as dialog utterances input into text box 155 of expert page 20. Expert role player 102 may be playing the role of a sales agent and may generate simulated system responses. The second input data may also include feedback data such as information indicating the rate at which expert role player 102 selects suggested responses 270 to respond to dialogs, or which among suggested responses 270 are most appropriate.

The first GUI and the second GUI may be configured to transmit data received from operators to controller 1000. Thus, controller 1000 may be configured to receive the first user input data and the second user input data. Controller 1000 may transmit the first user input data and the second user input data to, for example, sessions database 108. By transferring sessions back and forth between the first GUI and the second GUI, a dialog may proceed between user role player 101 and expert role player 102 asynchronously. In some embodiments, data may be stored in a database for later retrieval to be delivered to a GUI.

An object of dialog data collection may be to obtain diverse dialogs to represent many possible scenarios that could arise between a user and chatbot 60. Diverse dialog may help to prevent chatbot 60 from suffering from data sparseness. Diverse dialog may comprise discourse diversity (e.g., different flows of dialogs) and utterance diversity (e.g., different expressions having the same meaning, such as "hello" vs. "hi"). In view of the foregoing, controller 1000 may be configured to provide sessions to experts and users by sampling existing data, determining a sparse area, and selecting sessions within the sparse area. Smart sampling of sessions may be useful in collecting diverse dialog.

Controller 1000 may build a dialog flow graph. A dialog flow graph may be used as a visualization to represent possible conversation paths. A dialog flow graph may comprise a plurality of nodes including user utterances (U) and system responses (S) that may be connected. To achieve diverse dialog, a dialog flow graph may be used to visualize areas where a model requires more data in order to cover possible user utterances. A sampling rule may be configured to select nodes indicating areas of data sparseness.

Figure 11:
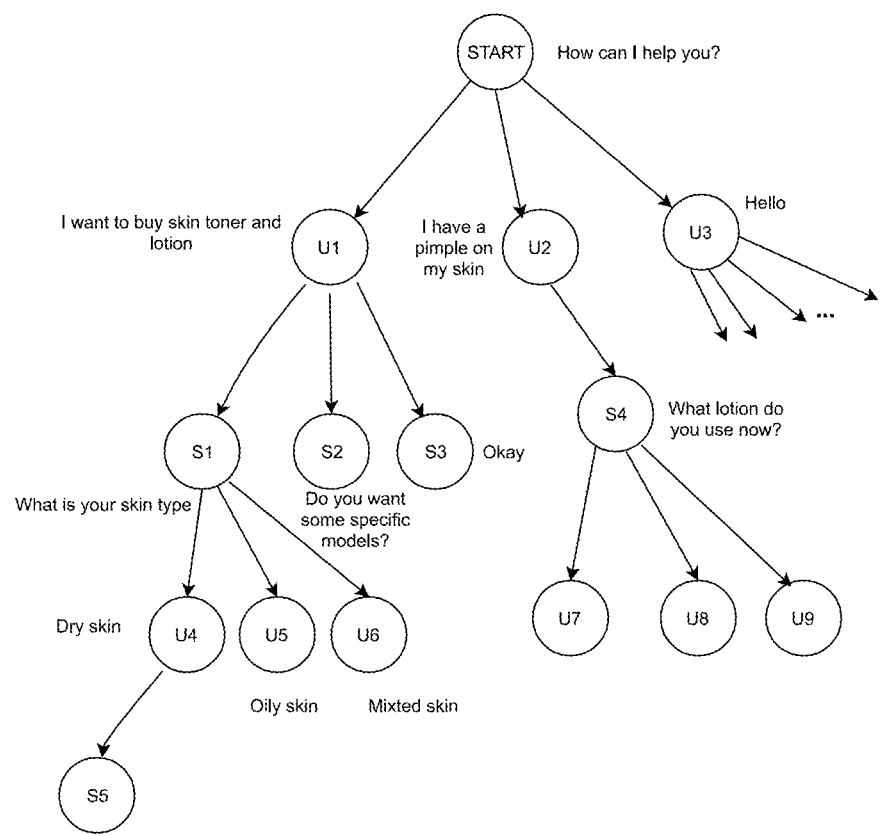
FIG. 11 is a dialog flow graph, consistent with embodiments of the present disclosure.

FIG. 11 illustrates a dialog flow graph, consistent with embodiments of the present disclosure. Some nodes in a dialog flow path may have higher potential for variation in user or system responses as compared to others. For example, for the node S1 ("What is your skin type?"), there may not be many variations of user responses following therefrom. That is, even if the form of user responses may be different, the content may be similar among a limited number of answers. In contrast, some utterances may be open-ended, and may have high potential for diverse answers to be input in response. For example, for the node U2 ("Hello"), there may be a large amount of diverse responses that can be collected. Thus, more sessions may be provided to a data collection team in the areas of diverse responses such that large amounts of data with highly diverse dialogs can be provided in these areas and data sparseness may be minimized. For example, controller 1000 may be configured to sample more on U3 than S1.

The selection of sessions for sampling may be based on feedback signals, such as the following. For example, feedback signals may include expert selections of pre-generated suggestions. As discussed above with respect to FIG. 4, response suggestions 270 may be provided from chatbot 60 to expert page 20. If currently existing data for the model is not sufficient at the time of a current session, the quality of response suggestions 270 may be considered not acceptable. Thus, experts may tend to type new utterances instead of selecting one of the provided response suggestions. The frequency of experts selecting response suggestions may be a good indicator of whether current data is sufficient, or whether more data is needed.

Another example of feedback signals may include utterance level feedback, such as thumbs-up and thumbs-down ratings from tester 103 and evaluator 105. As discussed above with respect to FIG. 6 and FIG. 8, operators may input feedback via feedback section 353 to indicate that a particular system response is acceptable or not acceptable. When dialogs accumulate a large amount of thumbs-up ratings, it may indicate that data is sufficient. On the other hand, when dialogs accumulate a large amount of thumbs-down rating, it may indicate that more sampling is needed at particular data points.

With reference to FIG. 11, a node among U1 to Un may be selected for dialog flow analysis. For example, controller 1000 may select one of U1 to Un and show all parent nodes in a dialog flow graph. Such a dialog flow graph may be useful to display dialog history to operators, such as expert role player 102. For example, when controller 1000 selects U4 ("Dry skin"), a past dialog tree may be displayed in reverse chronological order, as follows: S5: Dry skin—S1: What is your skin type?—U1: I want to buy skin toner and lotion—START: How can I help you? In some embodiments, dialog history may be provided in the form of a dialog flow that may list one or more nodes.

Initial data may be provided for training a model in system 1. Initial dialog history may include example dialogs for a few representative or important conversations. As an example, one path of dialogs depicted among the dialog flow graph of FIG. 11 may represent an initial dialog. This dialog may be provided in advance by an operator. Thus, a dialog flow graph may be built from an initial dialog where multiple branches may be formed from variations in the initial dialog.

Figure 12:
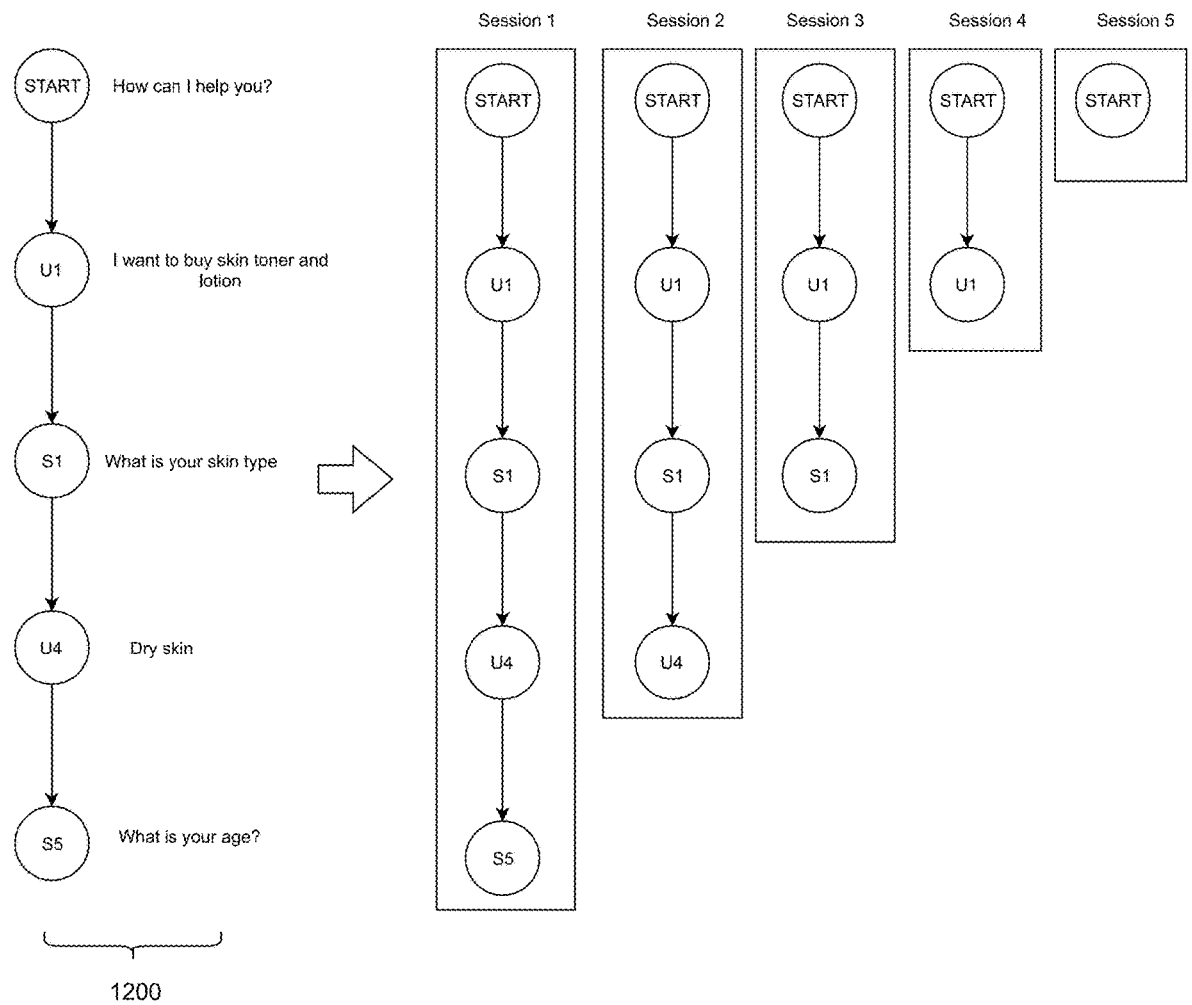
FIG. 12 illustrates a breakdown of an initial dialog into a plurality of sessions, consistent with embodiments of the present disclosure.

FIG. 12 illustrates a breakdown of an initial dialog 1201 into a plurality of sessions, consistent with embodiments of the present disclosure. Controller 1000 may be configured to process initial dialog 1201 to generate a plurality of sessions, e.g., Session 1, Session 2, Session 3, Session 4, and so on. A session may be generated for each turn of a dialog. Sessions among the plurality of sessions may be provided to a GUI, such as user page 10 or expert page 20.

Sessions may have varying length. For example, Session 1, as shown in FIG. 12, may have a value of length equal to 5 (i.e., 5 turns). Controller 1000 may be configured to generate a plurality of sessions having different length from the initial dialog. Furthermore, different sessions having the same length and different nodes may also be generated.

In operation, an operator may be presented with Session 1. For example, an operator may be presented with dialog window 150 in user page 10 that includes the dialog history of nodes U1, S1, U4, and S5. The last response in the dialog is system response S5 ("What is your age?") and thus the operator may participate in the dialog by responding to S5. Upon inputting an utterance, the current session may be transmitted to be stored in a database or provided to an expert role player page as a new session. Thus, the current session may be terminated when the operator's participation is complete, and a new session may be provided to the operator. As for the completed session, it may be transformed into a new session that includes the operator's recently entered input. For example, a new session (e.g., Session 6) may be generated that includes the dialog chain of Session 1 plus a new node (e.g., U10). This session may be later sampled and delivered to expert role players. Meanwhile, user role players may still be provided with Session 1 because it is the end of turn from the system and thus requires a user's input to proceed. Other users may respond to S5 in a different manner, thus providing more diverse dialog.

Sessions may be continuously generated using operator feedback to build increasingly longer sessions. Sessions may be fed back for operators to continue to add new utterances. Some sessions may be based on initial dialog, which may be provided in advance, and based on operator utterances received from a GUI, such as user page 10, or expert page 20. Still further, some sessions may be based on other feedback received from, for example, tester page 30, evaluator page 40, or dialog log 120.

A session may be lengthened by adding user or system utterances, e.g., Un, Sn, to obtain a session having a predetermined length, or greater. In some embodiments, it may be desirable to generate long sessions for providing to a GUI for operator feedback. For example, there may be a tendency for conversation partners to keep a dialog as brief as possible, particularly in a goal-based dialog setting. If operators are repeatedly provided with sessions having short dialog history, it may be difficult for a long, complex dialogs to develop. Accordingly, in some embodiments, sessions having a predetermined length or greater may be provided as new sessions to an operator. When an operator is provided with sessions having a long dialog history, more sessions may develop with increasingly longer dialog length. Sessions built in this manner may be stored in a database.

Figure 13:
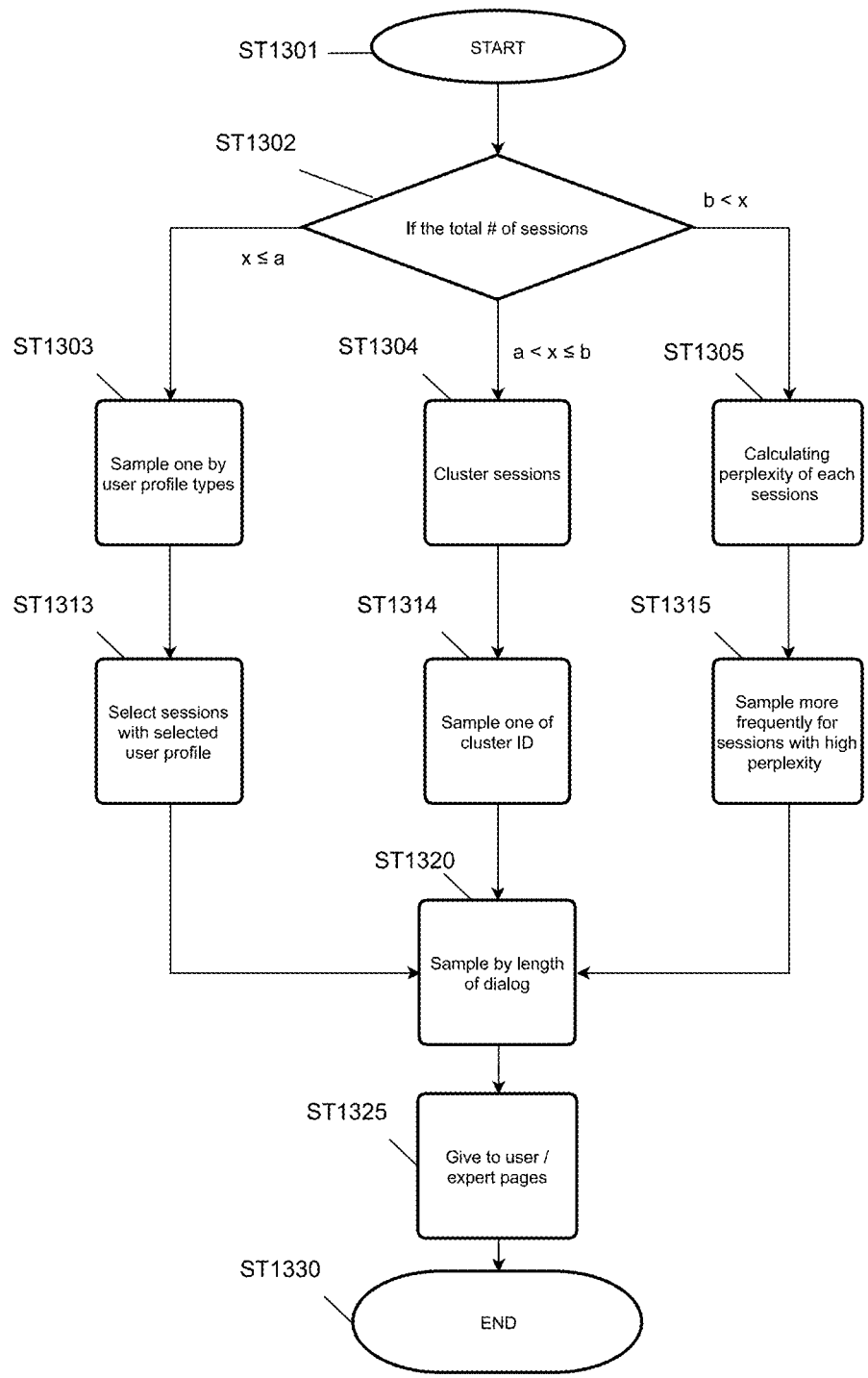
FIG. 13 is a flow chart illustrating a flow of a session sampling procedure, consistent with embodiments of the present disclosure.

Sampling strategy will now be discussed with reference to FIG. 13. FIG. 13 illustrates an exemplary flow of a session sampling process, consistent with embodiments of the present disclosure. The processing of the flow illustrated in FIG. 13 may be implemented by controller 1000, for example. Controller 1000 may be programmed to retrieve a stored dialog history based on a sampling rule. The stored dialog history may be one or more dialogs among a plurality of stored dialogs that are stored in database 110. Stored dialogs may include initial dialogs. Stored dialogs may also include accumulated dialogs generated by a data collection team. The stored dialogs may comprise the training data for the model for chatbot 60. The sampling rule may be based on a comparison of a number of data points, such as utterances or dialogs in the training data to one or more criteria. In some embodiments, a "session" may be used to represent a stored dialog.

The process of FIG. 13 begins at step ST1301. In step ST1302, a total number of sessions (x) may be compared to one or more criteria. The criteria may include a set of predetermined numbers, for example, a first number (a) and a second number (b). It may be determined that the number of sessions x is less than or equal to the first number a, in which case the process proceeds to step ST1303. It may be determined that the number of sessions x is greater than the first number a and less than or equal to the second number b, in which case the process proceeds to step ST1304. It may be determined that the number of sessions x is greater than the second number b, in which case the process proceeds to step ST1305. In some embodiments, criteria of, for example x<a, ax≤b, and x≥b may be used for the three branches, respectively. The number b may be larger than the number a.

The sampling rule may include conditions, such as those discussed above. When a condition is met, sampling may be performed according to a predetermined strategy. When a first condition is met, sampling may be performed based on user profiles associated with a plurality of sessions stored in a database. When a second condition is met, sampling may be performed based on classification of sessions, such as by cluster identification (ID). When a third condition is met, sampling may be performed based on perplexity of the sessions. FIG. 13 shows three branches of sampling strategies following determination step ST1302, the three branches corresponding to a low data content amount (x a), medium data content amount (a<x≤b), and a high data content amount (x>b) state, respectively. In some embodiments, further sampling may be performed, for example, sampling based on length of dialog. In some embodiments, order may be reversed such that sampling based on length occurs first, and then sampling based on other factors are carried out. Furthermore, the sampling associated with each branch may be changed with one another, or other types of sampling.

In step ST1303, a first condition (x a) may have been met. Thus, sampling may be conducted using user profiles. In some embodiments, user profiles may be provided by businesses wishing to deploy a chatbot. User profiles may include information pertinent to a good or service offered by the business. For example, user profiles may include information categories of skin type (dry, oily, mixed), acne type (whiteheads, blackheads, pustules, papules, cysts, nodules), and age range (<10, 10-20, 20-30, 30-40, >50 yrs). User profile information may be associated with a session. For example, a session may include dialog entries where a user and system discuss skin type and age. Thus, the session may be labeled as a session associated with the user profiles of "skin type" and "age range." Furthermore, the session may be further detailed by key and value pairs for each of the user profile categories. Thus, when a session includes dialog entries indicating that the user is in the age range of 10-20, the session may be labeled with key=age range and value=10-20.

Figure 14:
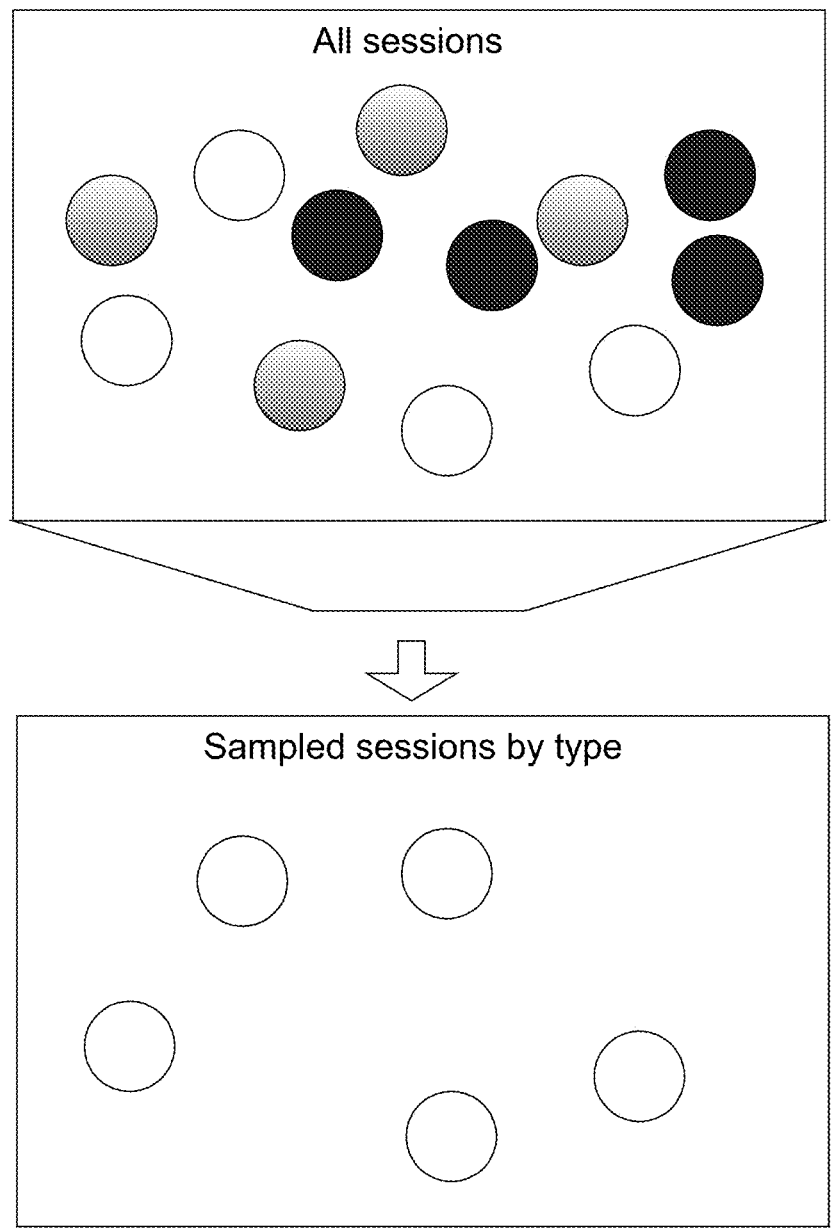
FIG. 14 illustrates a sampling strategy by session type, consistent with embodiments of the present disclosure.

FIG. 14 illustrates a sampling strategy by session type, consistent with embodiments of the present disclosure. Within a set of sessions, there may be provided sessions of various type, such as sessions associated with skin type, sessions associated with age range, and sessions associated with acne type, or combinations thereof. A sampling strategy based on session type may filter out sessions of a certain type. In some embodiments, sessions of only one type remain. Within a subset including one type of session, further subdivision may be performed. For example, within a subset of sessions associated with age range, the sessions may be further divided by values, such as <10, 10-20, 20-30, 30-40, etc.

Subsequent to a first type of sampling, a second type of sampling may be carried out. For example, after sessions are sampled based on session type, sampling based on session length may be performed. FIG. 14 illustrates an example of a first result of sessions sampled by type being further sampled based on length. Sampling may proceed until only one session is selected, which may then be provided to an operator through a GUI.

Referring back to FIG. 13, the process flow may have proceeded to step S1313, where a session may be selected in accordance with the sampling strategy corresponding to low data content. One or more sessions may be selected based on its session type, which may be indicated by user profile information. In some embodiments, a controller may perform session selection. For example, controller 1000 may analyze sessions based on type, and perform sampling based on session type. Controller 1000 may use a sampling strategy for uniformly selecting sessions distributed over session types, including each key and value. For example, controller 1000 may select an equal amount of sessions for each of the session types, and an equal amount of sessions having distinct key, value pairs. A sampling strategy may include randomly selecting sessions of a certain type. A uniform sampling strategy may be useful to build a base of dialog content when status of the dialog data amount is still low.

In some embodiments, sampling may be based on predetermined criteria, such as a target sample distribution. For example, it may be known that a certain type of skin condition affects a certain age group. Thus, rather than obtaining a uniform sample distribution, it may be desirable to obtain a distribution of samples favoring sessions in a particular area, such as sessions associated with the certain skin condition and the certain age group. Similarly, a known population distribution may be used to create sampling criteria. For example, a business wishing to employ a chatbot in connection with products popular with a certain age group may use a sampling strategy that samples the certain age group heavily.

In step ST1304, a second condition (a<x≤b) may have been met. Thus, sampling may be conducted using classification of sessions, such as analyzing based on a cluster ID, among other things. In this branch of the flow of FIG. 13, the status of the dialog data amount may be medium. However, the distribution of data may be skewed, such as being long tail. Thus, sampling strategy may be adjusted such that a more balanced distribution of data may be obtained.

Step ST1304 may include classification based on some characteristic of the dialog data. Examples of classification include cluster analysis, feature extraction, and pattern recognition. Various types of supervised or unsupervised machine learning systems may be employed. As examples, latent Dirichlet allocation (LDA), k-means, or deep-learning based clustering may be used. In step ST1304, controller 1000 may create one or more clusters of sessions where the sessions are related in some way. In the example of the second branch in the flow of FIG. 13, sessions may be clustered to generate a cluster ID for each session. In step ST1314, a session may be selected based on its cluster ID. Controller 1000 may select an equal amount of sessions having the same cluster ID. In some embodiments, controller 1000 may select sessions with under-represented cluster IDs.

Sampling based on cluster ID may be configured to produce a sample distribution according to predetermined criteria. For example, sampling may be configured to produce a balanced sample distribution, an unbalanced sample distribution, or a distribution in accordance with a target characteristic, or the like. In some embodiments, a target sample distribution may be used to create a target cluster ID. Sampling may be carried out so as to favor sessions closer to the target cluster ID.

Clustering may also be used to provide diverse data to different operators of a data collection team. Individual operators may have an operator ID. Sessions may be provided to operators through a GUI such that operators receive similar distributions of sessions (in terms of session type, cluster ID, etc.). That is, each operator may receive a distribution of sessions that is similar to other operators. The same or similar sessions may be provided to diverse operators so that diverse data may be obtained. For example, to achieve semantic richness, it may be desirable to receive utterances from a variety of operators for the same session. In contrast, if similar sessions are repeatedly provided to the same operator, collected dialog may have limited applicability for use as training data.

Classification may be further illustrated in terms of a dialog flow graph, such as that shown in FIG. 11. A dialog may have similarity to other dialogs in similar branches of a dialog flow graph. For example, a dialog including nodes START, U1, S1, and U4 may be similar to a dialog including nodes START, U1, S1, and U6. A sampling strategy may select dialogs that are far away from one another on a dialog flow graph in order to obtain diverse sessions, for example.

Referring back to FIG. 13, in step ST1305, a third condition (x>b) may have been met. Thus, sampling may be conducted based on perplexity of sessions. Perplexity may be a measure of possible divergence of responses from a node of dialog. For example, an open-ended utterance may have high perplexity because there may be many possible appropriate responses. Perplexity may be related to entropy. In this branch of the flow of FIG. 13, the status of the dialog data amount may be high. Thus, to enable data collection with further degrees of sophistication and higher variety, sampling techniques based on perplexity may be used. Higher degrees of sampling may lead to further data diversity.

Step ST1305 may include determining perplexity of sessions. Perplexity may be based on results from operators, such as testers and evaluators, among other characteristics. For example, testers and evaluators may provide feedback indicating that a dialog is complex, such that the user and system have discussed a variety of topics at a deep level of sophistication. Such feedback may be provided in the tester or evaluator's dialog level feedback. In some embodiments, a measure of perplexity may be calculated based on one or more factors. For example, perplexity may be determined for each of groups of data, such as length, type, cluster, etc. Controller 1000 may perform a perplexity determination.

In some embodiments, perplexity may be based, at least in part, on performance of chatbot 60. For example, node-level performance may be determined based on the rate at which expert role player 102 selects suggestions 270 provided by chatbot 60 at a particular turn in a dialog. A node may be determined to have high perplexity when the rate at which expert role players choose suggestions 270 is divided among different suggestions. That is, a node may be perplex when rates of choosing a particular suggested response among a plurality of suggested responses are substantially similar to one another. A session may be determined to have high perplexity when the last node in the dialog (to which the operator should respond) has high perplexity.

Furthermore, in some embodiments, perplexity may be based on analysis of an operator's subsequent utterances. For example, a node may be determined to have high perplexity when utterances collected in response thereto have a high degree of dissimilarity. Responses may be analyzed based on, for example, clustering.

In step ST1315, a session may be selected based on its determined perplexity. For example, controller 1000 may sample sessions with higher perplexity more frequently. Sampling based on perplexity may be useful to obtain dialog data with high diversity and low areas of data sparseness. For example, areas where data is sparse may correspond to nodes exhibiting a high degree of perplexity. A sampling strategy that favors sessions including nodes having open-ended utterances may lead to stronger data collection.

In some embodiments, sampling may also be based on the length of dialog of a session. For example, after step ST1313, ST1314, or ST1315, the process may proceed to step ST1320, where further sampling is performed. Sampling based on length may include determining a length of each utterance in a session, a length of an entire dialog in a session, and so on. Sampling based on length may be based on various measures of length. Thus, in each of the three branches of the flow of FIG. 13, two levels of sampling may be performed. In some embodiments, step ST1320 may be omitted. Furthermore, in some embodiments, step ST1320 may precede any of ST1303, ST1304, or ST1305.

In step ST1325, a session selected based on the sampling performed in a respective branch may be provided to a GUI, such as a user or expert page. The session may be added to a session list included in a user page or an expert page. The session may be a single session or a plurality of sessions. In step ST1330, the process may end.

In some embodiments, other factors may be considered in sampling selection processing. For example, operator feedback provided to indicate particular features of a dialog requiring attention may be fed into a sampling procedure. An expert, having high familiarity with dialog collection, may recognize a particular utterance as unique and may flag it as important. Such an indicator may be the basis for sample selection in some embodiments, similar to a cluster ID, for example, as discussed above.

In some embodiments, sampling may be adjusted in other ways. For example, experts may control the frequency of sampling for specific sessions. If an expert thinks he has received too many of the same session, the expert may indicate that a session is "duplicate," for example by clicking a button provided on a GUI. The duplicate session may thus be terminated without receiving an utterance from the expert role player. Furthermore, feedback identifying the session as duplicative may be fed to controller 1000, which may be used to adjust the sampling strategy. Sessions similar to the duplicative session may be determined by, for example, cluster analysis and may be sampled less often. On the other hand, in some embodiments, if the expert thinks the session is important, he may indicate the session as "booster," for example by clicking a button provided on a GUI. A session identified as "booster" may be used to adjust sampling strategy such that more of similar sessions are provided to operators to speed up dialog collection.

Data collected from a dialog data collection process may be used to train a natural language processing system model. For example, dialog data collected and stored through an asynchronous dialog collection process may be fed to chatbot 60 as training data. In some embodiments, further processing may include dialog data review, quality control, annotation, etc. Dialog data may be transmitted to chatbot 60 for training upon reaching a predetermined threshold level of size.

EXAMPLES

A better understanding of the present disclosure may be obtained through the following examples, which are set forth to illustrate, but not to be construed as limiting, the present disclosure.

In some embodiments, a chatbot build process may comprise data collection using asynchronous role playing, and selective sampling, among other things. A chatbot may be deployed by an entity, such as a brand owner, wishing to own their own chatbot, such as a marketing robot. An AI marketing robot can be easily embedded in digital advertising, product pages, messenger accounts, websites, and so on. Such a robot may establish a direct link between the brand owner and end user, and may be used to direct sales and improve customer relations.

Figure 15:
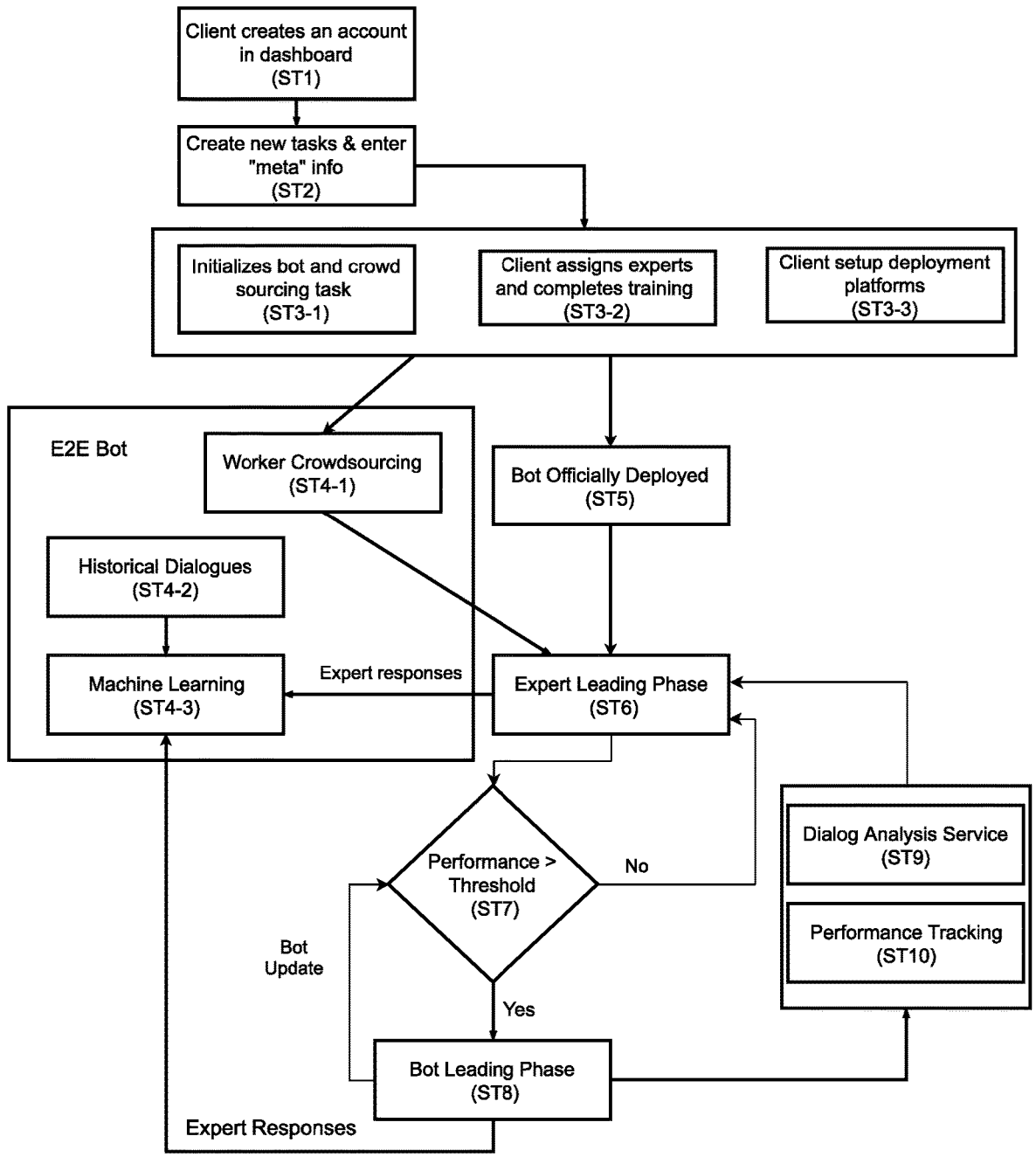
FIG. 15 illustrates a process flow of building a chatbot, consistent with embodiments of the present disclosure.

FIG. 15 illustrates a process flow of building a chatbot, consistent with embodiments of the present disclosure. In FIG. 15, the entity wishing to build their own chatbot may be referred to as a "client." Details of steps in the process flow of building the chatbot may include the following:

In step 1 (ST1), clients may create an account on a dashboard, which may include modules that implement the functions of: expert page, project management, bot performance monitors, analytics, user CRM (customer relations management), billing, account setting, and technical support. An analytics module may include display sections providing information on, for example: dialog history viewer, stats about dialog, expert team stats. A user CRM module may include: collector user information, CRM information exports. A billing module may include: past bills, payment methods. An account setting module may include: team management, login, account details, etc.

In step 2 (ST2), clients may create new projects via the dashboard. A project may be customized by selecting a domain, entering various information regarding offered goods or services, identifying user groups, providing sample dialogs, and adding attachments. Domains may include, for example, cosmetics, travel, healthcare, etc. In the example of cosmetics, the client may be prompted for further information including: product information, purchase links, picture links, and recommendation logic. Product information may include: name, briefs, applicable areas, size, texture, ingredients, effects, price, and origin. Recommendation logic may include, for example, "in which situations should this product be recommended?" with corresponding answers. Input to the recommendation logic may include setting a correspondence between, e.g., product A and group X users. User groups may be based on built-in templates, and may be modified. In the example of cosmetics, user features may include queries such as: if use sun protection (Y/N), if make up (Y/N), if use acne product (Y/N), if use remover (Y/N), if use skin-care products (Y/N), if first time acne (Y/N), if same area (Y/N), if has family history (Y/N), if stay up late (Y/N), if eat spicy food (Y/N), location (all cities), skin type (dry, oily, normal, sensitive, mixed), gender (m/f), area (left/right face, nose, forehead, lips, chin, body), age (number). A number of sample dialogs (e.g., 20-50) may be provided in which clients input example dialogs that meet their expectations. Attachments, such as images, links, or videos, may be transformed into quick buttons.

In step 3 (ST3-1), (ST3-2), and (ST3-3), the bot may be initialized. ST3-1 may include backend processing of uploaded data, which may include: creating a project graph and registering a permission key, arranging training resources, arranging deployment resources, and arranging role-playing data collection (RPDC) teams. ST3-2 may include finding sales experts, and may include: training experts, conducting trial runs, providing an expert team. ST3-3 may include determining deployment channels, which may include: messenger apps, HTML page, HTML floating window.

In step 4 (ST4-1), (ST4-2), and (ST4-3), an end-to-end bot may be provided. ST4-1 may include data collection via RPDC. ST4-2 may include using existing datasets. ST4-3 may include model learning of the bot, which may employ training data gathered from ST4-1, ST4-2, and expert responses.

Figure 16:
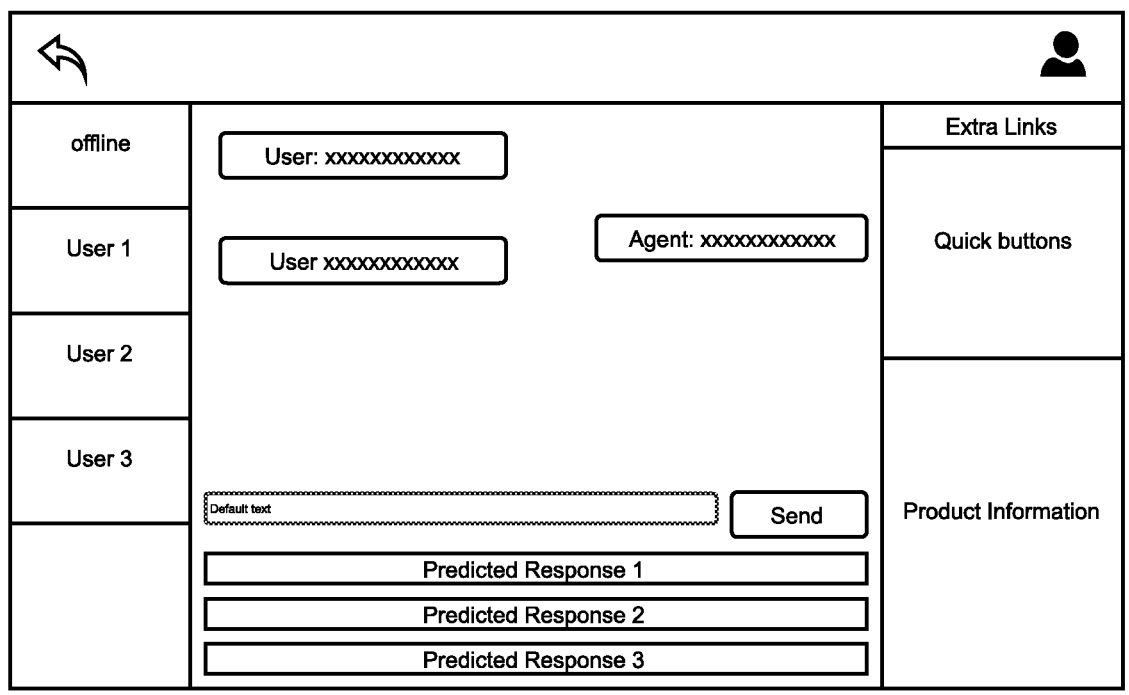
FIG. 16 illustrates an expert page, consistent with embodiments of the present disclosure.

In step 5 (ST5), the bot may go online. Client deployment channels may be connected to the backend, and sales experts may be logged in to an expert page. An exemplary expert page is shown in FIG. 16.

In step 6 (ST6), an expert leading phase may be provided. An expert leading phase may be used in early stages of bot deployment. A plurality of scenarios may be provided in which different processing is carried out. In a first scenario, a real user may access a user interface to interact with the clients, and an expert may be set to real user mode. In real user mode, a real user may be treated with high priority and an expert may be assigned to converse with them via instant chatting directly. In a second scenario, there may be no active real users, and experts may be switched to offline mode. In offline mode, experts may be assigned to answer questions dispatched from a dialog collection system. For example, dialogs may be provided from system 1 in the form of sessions. When a predetermined number (e.g., 5,000) of data points are collected, the bot may begin to give response predictions. Experts may continue to interact with users in both real user mode and offline mode, but experts may be encouraged to click predicted responses if correct rather than submitting new utterances.

Figure 17:
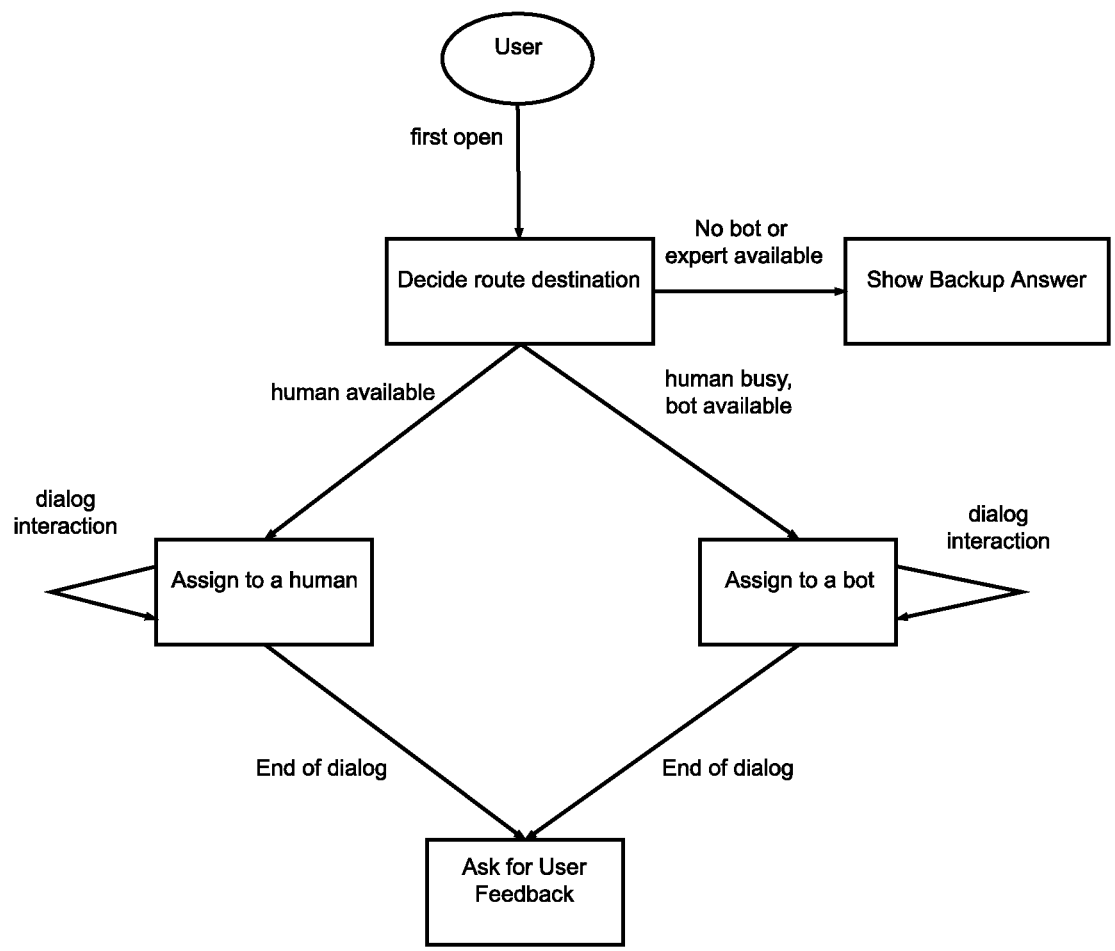
FIG. 17 illustrates a routing logic, consistent with embodiments of the present disclosure.

FIG. 17 illustrates a routing logic, consistent with embodiments of the present disclosure. A controller may be configured to implement the processing of FIG. 17. As shown in FIG. 17, a user may access a client's conversational agent. When the user first opens a chat with the conversational agent, a route destination may be determined. If no bot or expert is available, the conversational agent may be configured to provide backup answers to the user's inquiries. If a human operator is available, the chat may be assigned to a human. Dialog interaction with a human operator may be assisted by using a bot, for example to provide suggested responses. If a human is busy, while a bot is available, the chat may be assigned to a bot. After dialog interaction with either a human or a bot, at the end of dialog, the user may be asked to provide feedback. Feedback may also be gathered to enhance the performance of the bot by taking into account, for example, the rate at which the human operator chose suggested responses.

Referring back to FIG. 15, there may be a determination at step 7 (ST7). ST7 may include bot performance evaluation. An administrator may check system performance at a regular interval, for example on a daily basis. If performance is above a predetermined threshold, the administrator may switch the system to bot leading phase (ST8). If performance is not above the threshold, expert leading phase may be continued to collect more data.

In step 8 (ST8), a bot leading phase may be provided. In a bot leading phase, an expert's role may transition to handle optimizing the bot, which may include: continuing to engage in dialog with some number of users, handling situations where the bot in unable to provide an answer, using evaluator pages to give thumbs-up/thumbs-down feedback for human-bot dialogs, and providing correct answers for thumbs-down cases.

In step 9 (ST9), a dialog analysis service may be provided. Dialog analysis may include analyzing dialog data in real time and saving results to the dashboard. Data collected may include: user basic information, user characteristics, and user tags. User basic information may include contact information, gender, and social networking service identification. User characteristics may include skin type, if make-up, acne_type, etc.

In step 10 (ST10), performance monitoring may be provided. Performance monitoring may include analysis of prediction accuracy, click rate, and deal rate. Prediction accuracy may be the percentage that experts choose predicted answers. Click rate and deal rate may be provided as counters. Click rate may be incremented if a user clicks a purchase link. Deal rate may be incremented if a user completes a purchase through the platform of the conversational agent.

The block diagrams in the figures illustrate the architecture, functionality, and operation of possible implementations of systems, methods, and computer hardware/software products according to various exemplary embodiments of the present disclosure. In this regard, each block in a schematic diagram may represent certain arithmetical or logical operation processing that may be implemented using hardware such as an electronic circuit or an electronic control unit. Blocks may also represent a module, a segment, or a portion of code that comprises one or more executable instructions for implementing the specified logical functions. Controllers may be programmed to execute such instructions. It should be understood that in some alternative implementations, functions indicated in a block may occur out of the order noted in the figures. For example, two blocks shown in succession may be executed or implemented substantially concurrently, or two blocks may sometimes be executed in reverse order, depending upon the functionality involved. Some blocks may also be omitted. For example, in some embodiments, steps ST103 and ST104 may be performed in opposite order.

It should also be understood that each block of the block diagrams, and combination of the blocks, may be implemented by special purpose hardware-based systems that perform the specified functions or acts, or by combinations of special purpose hardware and computer instructions.

It will be appreciated that the embodiments of the present disclosure are not limited to the exact construction that has been described above and illustrated in the accompanying drawings, and that various modifications and changes can be made without departing from the scope thereof. For example, while some embodiments have been discussed in the context of using typed text in graphical user interfaces, a dialog data collection system may be similarly applied to a system employing speech recognition, among other things.

What is claimed is:

1. A computer-implemented method comprising:
providing a first graphical user interface configured to receive first user input data;
providing a second graphical user interface configured to receive second user input data;
asynchronously transmitting the first user input data to the second graphical user interface or the second user input data to the first graphical user interface;
generating training data for a natural language processing system model based on the first user input data and the second user input data;
providing a first plurality of sessions in the first graphical user interface; and
providing a second plurality of sessions in the second graphical user interface,
wherein the first graphical user interface is configured to terminate a session of the first plurality of sessions when the first user input data is received and, in response thereto, provide another session of the first plurality of sessions,
the second graphical user interface is configured to terminate a session of the second plurality of sessions when the second user input data is received and, in response thereto, provide another session of the second plurality of sessions.

2. The method of claim 1, wherein the first graphical user interface is further configured to:
provide a user profile;
provide a dialog history,
wherein the first user input data comprises a first dialog entry associated with the dialog history.

3. The method of claim 2, wherein the second graphical user interface is further configured to:
provide the dialog history including the first dialog entry,
wherein the second user input data comprises a second dialog entry associated with the dialog history, the second dialog entry being added asynchronously to the dialog history.

4. The method of claim 3, further comprising:
providing a suggested response in the second graphical user interface that is based on the dialog history,
wherein the suggested response is generated by the natural language processing system model.

5. The method of claim 1, wherein
the terminated session of the first plurality of sessions is provided to the second graphical user interface, and
the terminated session of the second plurality of sessions is provided to the first graphical user interface.

6. The method of claim 1, wherein
the second graphical user interface is configured to terminate a session of the second plurality of sessions in response to an indication that the dialog history is not needed for training data, and
provide another session of the second plurality of sessions.

7. The method of claim 6, wherein the terminated session of the second plurality of sessions is provided to the first graphical user interface.

8. The method of claim 1, further comprising
retrieving a stored dialog history based on a sampling rule among a plurality of stored dialogs; and
providing the stored dialog history to one of the first graphical user interface and the second graphical user interface,
wherein the sampling rule is based on a number of dialogs in the training data.

9. The method of claim 8, wherein the sampling rule comprises:
a first condition that the number of dialogs is less than or equal to a first number;
a second condition that the number of dialogs is greater than the first number and less than or equal to the second number; and
a third condition that the number of dialogs is greater than the second number,
wherein when the first condition is met, sampling is performed based on user profiles associated with the plurality of stored dialogs,
when the second condition is met, sampling is performed based on a dialog cluster ID, and
when the third condition is met, sampling is performed based on determined perplexity of the plurality of stored dialogs.

10. The method of claim 9, further comprising:
performing sampling based on a length of each of the plurality of stored dialogs.

11. A controller comprising:
a processor; and
a storage communicatively coupled to the processor, wherein the processor is configured to execute programmed instructions stored in the storage to:
provide a first graphical user interface configured to receive first user input data;
provide a second graphical user interface configured to receive second user input data;
asynchronously transmit the first user input data to the second graphical user interface or the second user input data to the first graphical user interface;
generate training data for a natural language processing system model based on the first user input data and the second user input data;
provide a first plurality of sessions in the first graphical user interface;
provide a second plurality of sessions in the second graphical user interface;
terminate a session of the first plurality of sessions when the first user input data is received and, in response thereto, provide another session of the first plurality of sessions in the first graphical user interface; and
terminate a session of the second plurality of sessions when the second user input data is received and, in response thereto, provide another session of the second plurality of sessions in the second graphical user interface.

12. The controller of claim 11, wherein the processor is further configured to execute programmed instructions to:
provide a user profile in the first graphical user interface; and
provide a dialog history in the first graphical user interface,
wherein the first user input data comprises a first dialog entry associated with the dialog history.

13. The controller of claim 12, wherein the processor is further configured to execute programmed instructions to:
provide the dialog history including the first dialog entry in the second graphical user interface,
wherein the second user input data comprises a second dialog entry associated with the dialog history, the second dialog entry being added asynchronously to the dialog history.

14. The controller of claim 11, wherein the processor is further configured to execute programmed instructions to:
retrieve a stored dialog history based on a sampling rule among a plurality of stored dialogs; and
provide the stored dialog history to one of the first graphical user interface and the second graphical user interface,
wherein the sampling rule is based on a number of dialogs in the training data.

15. The controller of claim 14, wherein the sampling rule comprises:
a first condition that the number of dialogs is less than or equal to a first number;
a second condition that the number of dialogs is greater than the first number and less than or equal to the second number; and
a third condition that the number of dialogs is greater than the second number,
wherein when the first condition is met, sampling is performed based on user profiles associated with the plurality of stored dialogs,
when the second condition is met, sampling is performed based on a dialog cluster ID, and
when the third condition is met, sampling is performed based on determined perplexity of the plurality of stored dialogs.

16. A non-transitory computer readable medium storing a set of instructions that is executable by a processor of a system to cause the system to perform a method comprising:
providing a first graphical user interface configured to receive first user input data;
providing a second graphical user interface configured to receive second user input data;

asynchronously transmitting the first user input data to the second graphical user interface or the second user input data to the first graphical user interface;
generating training data for a natural language processing system model based on the first user input data and the second user input data;
providing a first plurality of sessions in the first graphical user interface; and
providing a second plurality of sessions in the second graphical user interface,
wherein the second graphical user interface is configured to terminate a session of the second plurality of sessions in response to an indication that the dialog history is not needed for training data, and
provide another session of the second plurality of sessions.

* * * * *